United States Patent
Seo

(10) Patent No.: US 11,119,599 B2
(45) Date of Patent: Sep. 14, 2021

(54) DISPLAY DEVICE

(71) Applicant: SAMSUNG DISPLAY CO., LTD., Yongin-si (KR)

(72) Inventor: Young Seok Seo, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/818,873

(22) Filed: Mar. 13, 2020

(65) Prior Publication Data

US 2020/0293140 A1    Sep. 17, 2020

(30) Foreign Application Priority Data

Mar. 15, 2019 (KR) .................. 10-2019-0030038

(51) Int. Cl.
  *G06F 3/041* (2006.01)
  *G06F 3/0484* (2013.01)
  *G06F 9/451* (2018.01)
  *G06F 3/0488* (2013.01)
  *G06F 3/0481* (2013.01)

(52) U.S. Cl.
  CPC ........ *G06F 3/0414* (2013.01); *G06F 3/04817* (2013.01); *G06F 3/04845* (2013.01); *G06F 3/04883* (2013.01); *G06F 9/451* (2018.02)

(58) Field of Classification Search
  CPC ............... G06F 3/0414; G06F 3/04817; G06F 3/04845; G06F 3/04883; G06F 9/451
  See application file for complete search history.

(56) References Cited

U.S. PATENT DOCUMENTS

| 2014/0317722 | A1* | 10/2014 | Tartz | G06F 1/1684 726/19 |
| 2015/0138041 | A1  | 5/2015  | Hirakata et al. | |
| 2018/0039368 | A1* | 2/2018  | Choi | G06F 3/0414 |
| 2019/0087062 | A1* | 3/2019  | Polishchuk | G06F 3/0443 |

FOREIGN PATENT DOCUMENTS

KR    10-2015-0137436    12/2015

* cited by examiner

*Primary Examiner* — Kenneth B Lee, Jr.
(74) *Attorney, Agent, or Firm* — F. Chau & Associates, LLC

(57) ABSTRACT

A display device includes a display panel that includes an upper surface, a first side surface portion that extends from a first side of the upper surface, and a second side surface portion that extends from a second side connected to the first side, a first force sensor disposed in the first side surface portion and a second force sensor disposed in the second side surface portion, and a controller that determines a type and a state of an application being executed when a first input signal is sensed through the first force sensor and execute an operation corresponding to the type of the application and the state of the application being executed when a second input signal is sensed through the second force sensor within a preset time from an interruption of the first input signal.

20 Claims, 21 Drawing Sheets

DISPLAY DEVICE

This application claims priority under 35 U.S.C. § 119 from, and the benefit of, Korean Patent Application No. 10-2019-0030038, filed on Mar. 15, 2019 in the Korean Intellectual Property Office, the contents of which are herein incorporated by reference in their entirety.

BACKGROUND

1. Technical Field

Embodiments of the present disclosure are directed to a display device.

2. Discussion of the Related Art

Electronic devices, such as a smartphone, a tablet personal computer (PC), a digital camera, a notebook computer, a navigation device, or a smart television that provide images to a user include a display device that displays an image. A display device includes a display panel that can generate and display an image and various other input devices.

Touch panels that can detect a touch input are frequently included with display devices, specifically, to smartphones and tablet PCs. Due to its convenience, a touch panel tends to replace a conventional physical input device such as a key pad. In addition to touch panels, display devices with force sensors to implement various inputs are being developed.

Recently, a product that includes a four-sided edge display unit that can provide a large screen by enlarging a display unit of an electronic device is being developed.

SUMMARY

Embodiments of the present disclosure can provide a display device that can be imuitively operated by using force sensors mounted in edge regions of tbur sides of a touch panel and a display unit.

According to an embodiment of the present disclosure, a display device comprises: a display panel that includes an upper surface, a first side surface portion that extends from a first side of the upper surface, and a second side surface portion that extends from a second side connected to the first side, a first force sensor disposed in the first side surface portion and a second force sensor disposed in the second side surface portion, and a controller that determines a type and a state of an application being executed when a first input signal is sensed through the first force sensor and executes an operation that corresponds to the type and the state of the application being executed when a second input signal is sensed through the second force sensor within a preset time from an interruption of the first input signal.

The display device may further comprise a corner portion that is a non-display region formed between the first side surface portion and the second side surface portion.

The corner portion may be curved in a plan view.

When the type of the application corresponds to a photo album and the state of the application corresponds to a photo view mode, the controller may execute an operation of rotating an image displayed on the display panel by 90° from a direction of the first side to a direction of the second side.

When the type of the application corresponds to a photo album and the state of the application corresponds to a thumbnail view mode, the controller may execute an operation of dragging an icon displayed at a position at which the first input signal is generated and dropping the icon at a position at which the second input signal is generated.

The display panel may further comprise a first upper curved surface portion formed between the upper surface and the first side surface portion, and a second upper curved surface portion formed between the upper surface and the second side surface portion.

The first force sensor may be disposed in the first upper curved surface portion and the first side surface portion, and the second force sensor may be disposed in the second upper curved surface portion and the second side surface portion.

The first force sensor and the second force sensor may each include a plurality of sensing cells.

The controller may display, a guide mark on the first upper curved surface portion or the second upper curved surface portion according to the type and the state of the application.

According to an embodiment of the present disclosure, a display device comprises: a display panel that includes an upper surface, a first side surface portion that extends from a first side of the upper surface, a second side surface portion that extends from a second side that connected to the first side, a third side surface portion that extends from a third side opposite to the first side, and a fourth side surface portion that extends from a fourth side opposite to the second side, a first force sensor disposed in the first side surface portion, a second force sensor disposed in the second side surface portion, a third force sensor disposed in the third side surface portion, and a fourth force sensor disposed in the fourth side surface portion, and a controller that determines a type and a state of an application being executed when a first input signal is sensed through the first force sensor and the third force sensor and executes a function that corresponds to the type and the state of the application being executed when a second input signal is sensed through at least one of the first to fourth force sensors in a state in which the first input signal is maintained.

The second input signal may be sensed through the second force sensor or the fourth farce sensor.

The first force sensor, the second force sensor, the third force sensor, and the fourth force sensor may each include a plurality of sensing cells.

The first input signal may be a squeezing signal of concurrently pressing one or more sensing cells of the first force sensor and the third force sensor.

The second input signal may correspond to a tap gesture of intermittently pressing some of the plurality of sensing cells of the second force sensor or the fourth force sensor, or a swipe gesture of sequentially pressing the plurality of sensing cells of the second force sensor or the fourth force sensor.

When the type of the application corresponds to a music player and the second input signal corresponds to a tap gesture, the controller may play or stops music.

When the type of the application corresponds to a music player and the second input signal corresponds to a swipe gesture sensed through the second force sensor, the controller may adjust a volume according to a direction and a movement distance of the swipe gesture.

When the type of the application corresponds to a music player and the second input signal corresponds to a swipe gesture sensed through the fourth force sensor, the controller may play a previous piece of music or a next piece of music according to a direction of the swipe gesture.

The second input signal may be sequentially sensed through the first force sensor and the fourth force sensor, or sequentially sensed through the first force sensor and the second force sensor.

When the type of the application corresponds to a camera, the controller may zoom in or zoom out on a subject, according to whether the second input signal is sequentially sensed through the first force sensor and the fourth force sensor, or sequentially sensed through the first force sensor and the second force sensor.

DETAILED DESCRIPTION OF EXEMPLARY EMBODIMENTS

Embodiments of the present disclosure will now be described more fully hereinafter with reference to the accompanying drawings, in which exemplary embodiments of the disclosure are shown. Embodiments may, however, take different forms and should not be construed as limited to exemplary embodiments set forth herein. The same reference numbers may indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present.

Hereinafter, exemplary embodiments of the present disclosure will be described with reference to the attached drawings.

Figure 1:
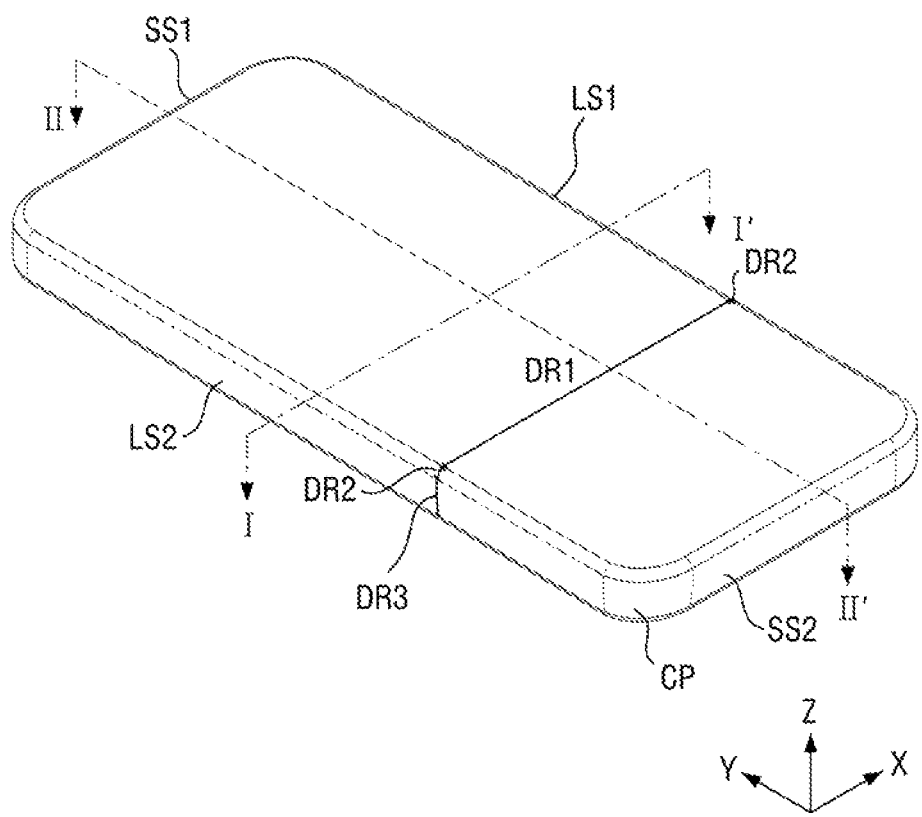
FIG. 1 is a perspective view of a display device according to an exemplary embodiment.
Figure 2:
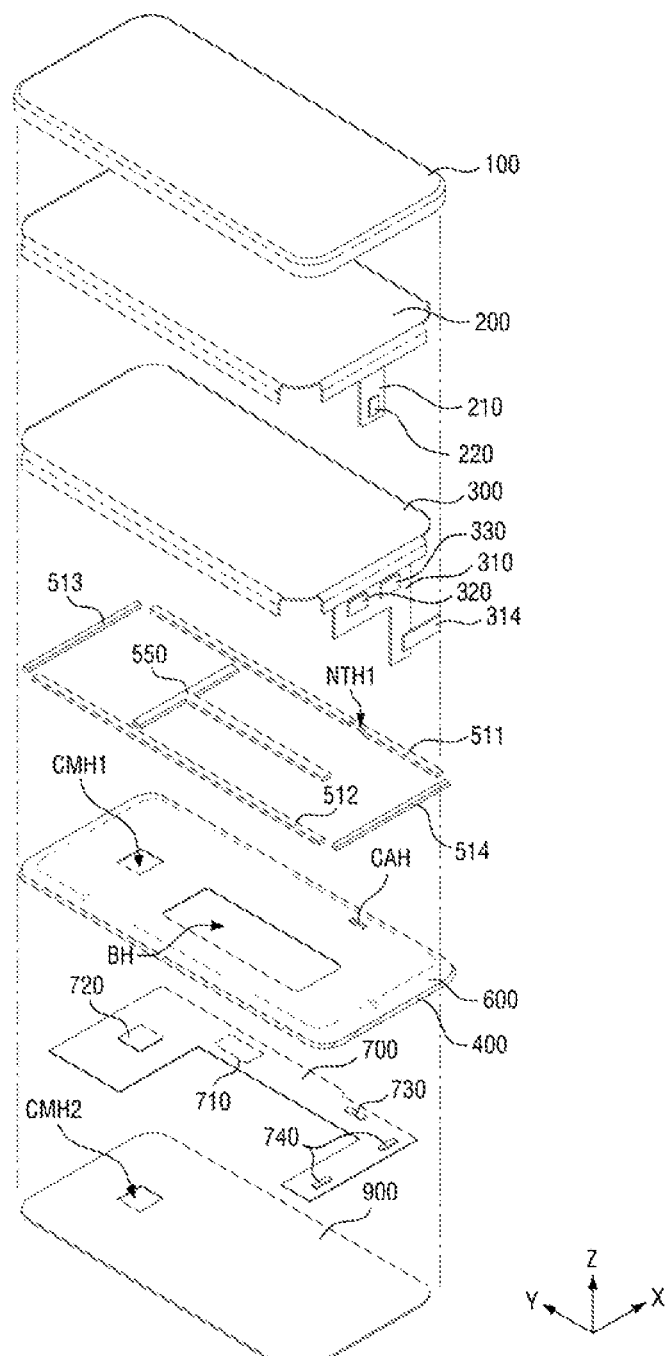
FIG. 2 is an exploded perspective view of a display device according to an exemplary embodiment.

FIG. 1 is a perspective view of a display device according to an exemplary embodiment FIG. 2 is an exploded perspective view of a display device according to an exemplary embodiment.

Referring to FIGS. 1 and 2, a display device 10 according to an exemplary embodiment includes a cover window 100, a touch sensing device 200, a touch circuit board 210, a touch driver 220, a display panel 300, a display circuit board 310, a display driver 320, a pressure sensing unit 330, a first force sensor 511, a second force sensor 512, a pressure sensing circuit board 550, also referred to as a third circuit board, a middle frame 600, a main circuit board 700, and a lower cover 900.

In a present specification, the terms "upper portion," "top," and "upper surface" indicates a direction in which the cover window 100 is disposed with respect to the display panel 300, that is, a Z-axis direction, and the terms "lower portion," "bottom," and "lower surface" indicate a direction in which the middle frame 600 is disposed with respect to the display panel 300, that is, a direction opposite to the Z-axis direction, in addition, the terms "left," "right," "upper," and "lower" indicate directions when the display panel 300 is viewed from above.

According to an embodiment, the display device 10 has a substantially rectangular shape in a plan view. The display device 10 has a rectangular shape of which a corner has a right angle or is rounded in a plan view. The display device 10 has two long sides LS1 and LS2 and two short sides SS1 and SS2. In the display device 10 or members such as the display panel 300 included therein, in a plan view, a long side at a right side will be referred to as a first long side LS1, a long side at a left side will be referred to as a second long side LS2, a short side at an upper side will be referred to as a first short side SS1, and a short side at a lower side will be referred to as a second short side SS2. Lengths of the long sides LS1 and LS2 of the display device 10 are in a range from 1.5 times to 2.5 times lengths of the short sides SS1 and SS2.

According to an embodiment, the display device 10 includes a first region DR1, a second region DR2, and a third region DR3, which are disposed on different surfaces. The first region DR1 is disposed on a first surface. The first surface is an upper surface of the display device 10. The second region DR2 is connected to the first region DR1 and is bent or curved from the first region DR1. The second region DR2 is located on a second surface that is curved from the first surface at an angle or intersects at an angle with the first surface. The second region DR2 of the display device 10 is disposed around the first region DR1. The third region DR3 is connected to the second region DR2 and is bent or curved from the second region DR2. The third region DR3 is located on a third surface that intersects at an angle with the second surface, and the third surface may be perpendicular to the first surface, but embodiments of the present disclosure are not limited thereto.

According to an embodiment, each of the second region DR2 and the third region DR3 are disposed at the first and second short sides SS1 and SS2 and the first and second long sides LS1 and LS2. For example, the second region DR2 is a curved surface portion that extends from an edge of the first region DR1 to each of the first and second short sides SS1 and SS2 and each of the first and second long sides LS1 and LS2. The third region DR1 extends from an end of the second region DR2 and corresponds to side surfaces of each of the first and second short sides SS1 and SS2 and each of the first and second long sides LS1 and LS2 of the display device 10.

According to an embodiment, the first region DR1 of the display device 10 is a main display surface, but the second region DR2 and the third region DR3 as well as the first region DR1 can also be used as a display region of the display device 10. Hereinafter, an embodiment in which the first region DR1 of the display device 10 is flat, i.e., a horizontal upper surface, the second region DR2 is curved, and the third region DR3 is vertical, i.e., the side surface, will be described, but embodiments of the present disclosure are not limited thereto. In addition, the display device 10 further includes a corner portion CP between the short sides and the lone sides. The corner portion CP is a non-display region that separates a long side from a short side and connects a long side from a short side, and is separated from the first region DR1 by the second region DR2, but embodiments of the present disclosure are not limited thereto. The corner portion CP can be a display region in which along side and a short side are connected.

According to an embodiment, the cover window 100 is disposed on the display panel 300 and covers an upper surface and side surfaces of the display panel 300. Thus, the cover window 100 protects the upper surface and the side surfaces of the display panel 300. The cover window 100 is attached to the touch sensing device 200 through an adhesive member. The adhesive member may be an optically clear adhesive film (OCA) or an optically clear resin (OCR).

According to an embodiment, the cover window 100 corresponds to the display panel 300 and is disposed on the first region DR1, the second region DR2, and the third region DR3. The cover window 100 has a plurality of holes that expose a plurality of functional units, such as a front camera, a front speaker, an infrared sensor, an iris recognition sensor, an ultrasonic sensor, and a luminance sensor. However, when some or all of the functional units are embedded in the display panel 300, some or all of the holes are not formed in the cover window 100.

According to an embodiment, the cover window 100 may be made of glass, sapphire, or plastic. The cover window 100 may be rigid or flexible.

According to an embodiment, the touch sensing device 200 is disposed between the cover window 100 and the display panel 300. The touch sensing device 200 is disposed on the first region DR1, the second region DR2, and the third region DR3. Accordingly, a user's touch can be sensed not only in the first region DR1 but also in the second region DR2 and the third region DR3.

According to an embodiment, the touch sensing device 200 is attached to a lower surface of the cover window 100 through a first adhesive member. A polarizing film is added to prevent a visibility reduction caused by external light being reflected by the touch sensing device 200. In this case, the polarizing film is attached to the lower surface of the cover window 100 through the first adhesive member.

According to an embodiment, the touch sensing, device 200 can sense a user's touch position and may be implemented as a capacitance type, such as a self capacitance type or a mutual capacitance type. When the touch sensing device 200 is implemented as a self-capacitance type, the touch sensing device 200 includes only touch driving electrodes. When the touch sensing device 200 is implemented as a mutual capacitance type, the touch sensing device 200 includes touch driving electrodes and touch sensing electrodes. Hereinafter, for convenience of explanation, a touch sensing device will be described that is implemented as the mutual capacitance type.

According to an embodiment, the touch sensing device 200 is formed as a panel or a film. In this case, the touch sensing device 200 is attached onto a thin encapsulation film of the display panel 300 through an adhesive member. The adhesive member may be an OCA or an OCR.

Alternatively, according to an embodiment, the touch sensing device 200 is integrally formed with the display panel 300. In this case, the touch driving electrodes and the touch sensing electrodes of the touch sensing device 200 are formed on the thin encapsulation film of the display panel 300.

Figure 3:
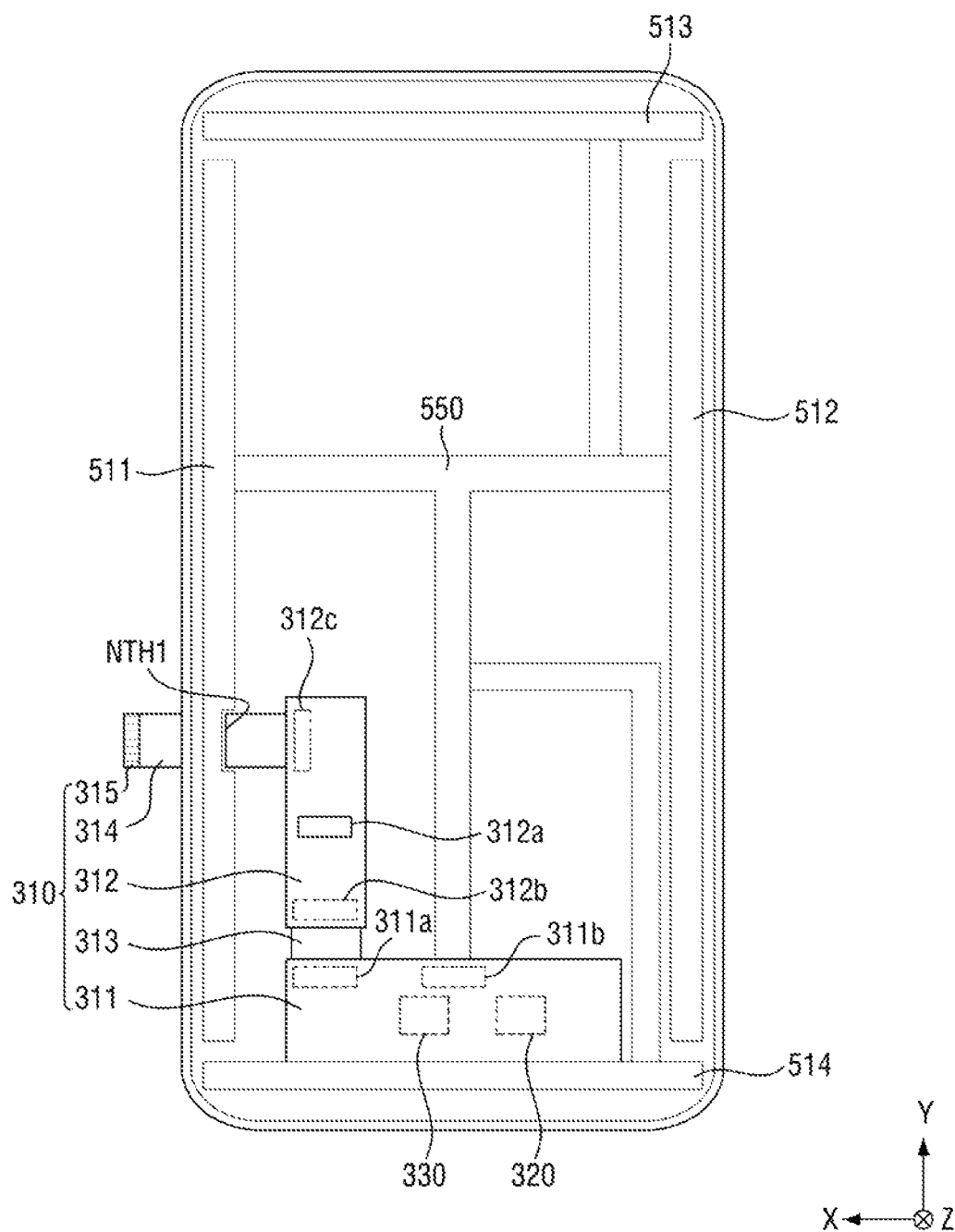
FIG. 3 is a bottom view of a display panel according to an exemplary embodiment.

According to an embodiment, the touch circuit board 210 is attached to one side of the touch sensing device 200. Specifically, one side of the touch circuit board 210 is attached to pads provided on one side of the touch sensing device 200 using an anisotropic conductive film. In addition, a touch connection portion is provided at an other side of the touch circuit board 210 and is connected to a touch connector 312a of the display circuit board 310 as shown in FIG. 3. The touch circuit board 210 is a flexible printed circuit board.

According to an embodiment, the touch driver 220 transmits touch driving signals to the touch driving electrodes of the touch sensing device 200, detects sensing signals from the touch sensing electrodes of the touch sensing device 200, and analyzes the sensing signals to calculate a touch position of a user. The touch driver 220 is formed as an integrated circuit and is mounted on the touch circuit board 210.

According to an embodiment, the display panel 300 is disposed below the touch sensing device 200. The display panel 300 is disposed on the first region DR1, the second region DR2, and the third region DR3. Therefore, an image of the display panel 300 is visible not only in the first region DR1 but also in the second region DR2 and the third region DR3.

According to an embodiment, the display panel 300 is a light-emitting display panel including a light-emitting element. For example, the display panel 300 may be an organic light-emitting display panel that uses an organic light-emitting diode, a micro light-emitting diode (LED) display panel that uses a micro LED, or a quantum dot LED display panel that includes a quantum dot LED.

According to an embodiment, the display panel 300 includes a substrate, a thin film transistor layer disposed on the substrate, a light-emitting element layer, and a thin film encapsulation layer.

According to an embodiment, the display panel 300 is flexible and is made of plastic. In this case, the substrate includes a flexible substrate and a support substrate. Since the support substrate supports the flexible substrate, a flexibility thereof is less than that of the flexible substrate. Each of the flexible substrate and the support substrate includes a flexible polymeric material. For example, each of the flexible substrate and the support substrate includes one of polyethersulphone (PES), polyacrylate (PA), polyarylate (PAR), polyetherimide (PEI), polyethylene naplithalate (PEN), polyethylene terephthalate (PET), polyphenylene sulfide (PPS), polyallylate, polyimide (PI), polycarbonate (PC), cellulose triacetate (CAT), or cellulose acetate propionate (CAP), or a combination thereof.

According to an embodiment, the thin film transistor layer is disposed on the substrate. The thin film transistor layer includes scan lines, data lines, and thin film transistors. Each of the thin film transistors includes a gate electrode, a semiconductor layer, and source and drain electrodes. When a scan driver is formed directly on the substrate, the scan driver is formed together with the thin film transistor layer.

According to an embodiment, the light-emitting element layer is disposed on the thin film transistor layer. The light-emitting element layer includes anodes, a light-emitting layer, a cathode, and banks. The light-emitting layer includes an organic light-emitting layer that includes an organic material. For example, the light-emitting layer may include a hole injection layer, a hole transporting layer, an organic light-emitting layer, an electron transporting layer, and an electron injection layer. The hole injection layer and the electron injection layer may be omitted. When a voltage is applied to the anode and the cathode, holes and electrons move to the organic light-emitting layer through the hole transporting layer and the electron transporting layer and couple to each other in the organic light-emitting layer to emit light. The light-emitting element layer is a pixel array layer in which pixels are formed. Thus, a region in which the light-emitting element layer is formed is a display region that displays an image. A peripheral region of the display region is a non-display region.

According to an embodiment, the thin film encapsulation layer is disposed on the light-emitting element layer. The thin film encapsulation layer can prevent oxygen or moisture from permeating into the light-emitting element layer. The thin film encapsulation layer includes at least one inorganic film and at least one organic film.

According to an embodiment, the display circuit board 310 is attached to one side of the display panel 300. Specifically, one side of the display circuit board 310 is attached to pads provided on one side of the display panel 300 using an anisotropic conductive film. The display circuit board 310 is bent toward a lower surface of the display panel 300. The touch circuit board 210 is also bent toward the lower surface of the display panel 300. Accordingly, the touch connection portion provided at an end of the other side of the touch circuit board 210 is connected to the touch connector 312a of the display circuit board 310. The display circuit board 310 will be described in detail below with reference to FIGS. 3 and 4.

According to an embodiment, the display driver 320 outputs signals and voltages through the display circuit board 310 that drive the display panel 300. The display driver 320 is an integrated circuit and is mounted on the display circuit board 310, but embodiments of the present disclosure are not limited thereto. For example, the display driver 320 can be attached directly onto the substrate of the display panel 300. In this case, the display driver 320 is attached to an upper or lower surface of the substrate of the display panel 300.

According to an embodiment, a panel lower member is disposed below the display panel 300. The panel lower member includes at least one of a light absorption member that absorbs light that is externally incident thereto, a buffer member that absorbs external impacts, a heat dissipation member that efficiently dissipates heat from the display panel 300, and a light blocking layer that blocks external light.

According to an embodiment, the light absorption member is disposed below the display panel 300. The light absorption member prevents transmission of light to prevent components disposed below the light absorption member from being visible from an upper portion of the display panel 300. These components include a first force sensor 511, a second force sensor 512, a third force sensor 513, a fourth force sensor 514, the display circuit board 310, etc. The light absorption member includes a light absorbing material such as a black pigment or a dye.

According to an embodiment, the buffer member is disposed below the light absorption member. The buffer member absorbs an external impact to prevent the display panel 300 from being damaged. The buffer member may include a single layer or a plurality of layers. For example, the buffer member is made of a polymer resin such as polyurethane, polycarbonate, polypropylene, or polyethylene, or is made of an elastic material, such as a sponge formed by foam-molding rubber, a urethane-based material, or an acrylic-based material. The buffer member is a cushioning layer.

According to an embodiment, the heat dissipation member is disposed below the buffer member. The heat dissipation member includes a first heat dissipation layer that includes graphite or carbon nanotubes, and a second heat dissipation layer that is a thermally conductive thin metallic film formed from copper, nickel, ferrite, or silver, which can shield an electromagnetic wave.

According to an embodiment, each of the first force sensor 511, the second force sensor 512, the third force sensor 513, and the fourth force sensor 514 are disposed in an edge of the first region DR1, the second region DR2, and the third region DR3. However, embodiments of the present disclosure are not limited thereto, and the first force sensor 511, the second force sensor 512, the third force sensor 513, and the fourth force sensor 514 may be disposed in the second region DR2 and the third region DR3 or may be disposed only in the third region DR3. In this case, a navigation icon is disposed in an edge of the first region DR1 to correspond to pressure sensing cells of the first force sensor 511, the second force sensor 512, the third force sensor 513, and the fourth force sensor 514 and thus indicates a position of the pressure sensing cell to a user.

According to an embodiment, the first force sensor 511 is disposed on the first long side LS1 of the display device 10 and is disposed below the display panel 300. The second force sensor 512 is disposed on the second long side LS2 of the display device 10 and is disposed below the display panel 300. The first force sensor 511 and the second force sensor 512 face each other in a first, X-axis direction.

According to an embodiment, the third force sensor 513 is disposed on the first short side SS1 of the display device 10 and is disposed below the display panel 300. The fourth force sensor 514 is disposed on the second short side SS2 of the display device 10 and is disposed below the display panel 300. The third force sensor 513 and the fourth force sensor 514 are disposed opposite to each other in a second, Y axis direction.

According to an embodiment, each of the first force sensor 511, the second force sensor 512, the third force sensor 513, and the fourth force sensor 514 are attached to a lower surface of the panel lower member. Each of the first force sensor 511, the second force sensor 512, the third force sensor 513, and the fourth force sensor 514 is connected through the pressure sensing circuit board 550 to the display circuit board 310. The first force sensor 511, the second force sensor 512, the third force sensor 513, and the fourth force sensor 514 are illustrated in FIG. 3 as being connected to one pressure sensing circuit board 550, but embodiments of the present disclosure are not limited thereto. Each of the first force sensor 511, the second force sensor 512, the third force sensor 513, and the fourth force sensor 514 can be connected to the display circuit board 310 through other pressure sensing circuit boards 550.

As shown in FIG. 3, according to an embodiment, the pressure sensing unit 330 is mounted on the display circuit board 310 to sense pressure by driving the first force sensor 511, the second force sensor 512, the third force sensor 513, and the fourth force sensor 514. In this case, the pressure sensing unit 330 is an integrated circuit. The pressure sensing unit 330 is integrated into the display driver 320 to form one integrated circuit.

According to an alternative embodiment, the pressure sensing circuit board 550 is connected to the touch circuit board 210 rather than the display circuit board 310. In this case, the pressure sensing unit 330 is mounted on the touch circuit board 210. The pressure sensing unit 330 is integrated into the touch driver 220 to form one integrated circuit.

According to an embodiment, the middle frame 600 is disposed below the panel lower member. The middle frame 600 includes one of a synthetic resin or a metal, or both of the synthetic resin and the metal.

In an exemplary embodiment, a waterproofing member 400 is disposed on an edge of the middle frame 600. For example, the waterproofing member 400 surrounds a side surface of the middle frame 600. However, embodiments of the present disclosure are not limited thereto.

According to an embodiment, the waterproofing member 400 is disposed outside of each of the first force sensor 511, the second force sensor 512, the third force sensor 513, and the fourth force sensor 514. The waterproofing member 400 is attached to each of a lower surface of the panel lower member and an upper surface of the middle frame 600.

According to an exemplary embodiment shown in FIGS. 1 and 2, since the waterproofing member 400 is disposed outside the first force sensor 511, the second force sensor 512, the third force sensor 513, and the fourth force sensor 514, water and dust are prevented from permeating between the display panel 300 and the middle frame 600. That is, the display device 10 is substantially waterproof and rustproof.

According to an embodiment, the middle frame 600 has a first camera hole CMH1 into which a camera device 720 is inserted, a battery hole BH that dissipates heat of a battery, and a cable hole CAH through which a second connection cable 314 connected to the display circuit board 310 passes. The cable hole CAH is formed close to a right edge of die middle frame 600. In this case, the cable hole CAH is covered by the first force sensor 511 below the panel lower member on a right edge of the display panel. Accordingly, as shown in FIG. 2, the first force sensor 511 includes a first notch portion NTH1 formed concave inward in one side thereof to expose the cable hole CAH, so that the first force sensor 511 does not cover the cable hole CAH.

In addition, according to an embodiment, the middle frame 600 is disposed below the panel lower member of the display panel 300, the first force sensor 511, the second force sensor 512, the third force sensor 513, and the fourth force sensor 514. When pressure is applied to any one of the first force sensor 511, the second force sensor 512, the third force sensor 513, or the fourth force sensor 514, the middle frame 600 supports the first force sensor 511, the second force sensor 512, the third force sensor 513, and the fourth force sensor 514. Accordingly, pressure applied to the first force sensor 511, the second force sensor 512, the third force sensor 513, and the fourth force sensor 514 can be sensed.

According to an embodiment, a main circuit board 700 is disposed below the middle frame 600. The main circuit board 700 may be a printed circuit board or a flexible printed circuit board.

According to an embodiment, the main circuit board 700 includes a main processor 710, the camera device 720, a main connector 730 and a sound output device such as speakers 740 that can output sound. The main processor 710 and the main connector 730 are disposed on a lower surface of the main circuit board 700 that faces the lower cover 900. In addition, the camera device 720 is disposed on both of an upper surface and the lower surface of the main circuit board 700.

According to an embodiment, the main processor 710 controls all functions of the display device 10. For example, the main processor 710 outputs image data to the display driver 320 of the display circuit board 310 such that the display panel 300 displays an image. In addition, after the main processor 710 receives touch data from the touch driver 220 and determines a user's touch position, the main processor 710 executes an application indicated by an icon displayed at a user's touch position. Furthermore, the main processor 710 receives pressure sensing data from the touch driver 220 or the pressure sensing unit 330 and executes an application indicated by an icon displayed at a user's touch position based on the pressure sensing data. In addition, the main processor 710 controls a vibration generator that vibrates to implement a haptic based on the pressure sensing data. The main processor 710 may be an application processor, a central processing unit, or a system chip that includes an integrated circuit.

According to an embodiment, the camera device 720 processes an image frame of a still image, a moving image, etc., obtained by an image sensor in a camera mode and outputs the image frame to the main processor 710.

According to an embodiment, the second connection cable 314 that passes through the connector hole CAH of the middle frame 600 is connected to the main connector 730 disposed on the lower surface of the main circuit board 700 through a gap between the middle frame 600 and the main circuit board 700. Thus, the main circuit board 700 is electrically connected to the display circuit board 310 and the touch circuit board 210.

In addition, according to an embodiment, the main circuit board 700 is further equipped with a mobile communication module that transmits and receives a wireless signal to and from at least one of a base station, an external terminal, and a server on a mobile communication network. The wireless signal can include various types of data associated with transmission and reception of a voice signal, a video call signal, or a text/multimedia message.

In an exemplary embodiment, the lower cover 900 is disposed below the middle frame 600 and the main circuit board 700. The lower cover 900 is coupled and fixed to the middle frame 600. For example, the lower cover 900 supports a side surface, i.e., an end of the third region DR3 that corresponds to the cover window 100, the touch sensing device 200, the display panel 300, and the panel lower member. However, embodiments of the present disclosure are not limited thereto, and the lower cover 900 may cover the side surface of the third region DR3 and a portion of an upper surface of the cover window 100, the touch sensing device 200, the display panel 300, and the panel lower member.

According to an embodiment, the lower cover 900 is a lower exterior of the display device 10. The lower, cover 900 includes plastic or a metal. In addition, a second camera hole CMH2, through which the camera device 720 is inserted to protrude outward, is formed in the lower cover 900. Positions of the camera device 720 and positions of the first and second camera holes CMH1 and CMH2 that correspond thereto are not limited to those shown in FIGS. 1, 2, 4, and 5.

Figure 4:
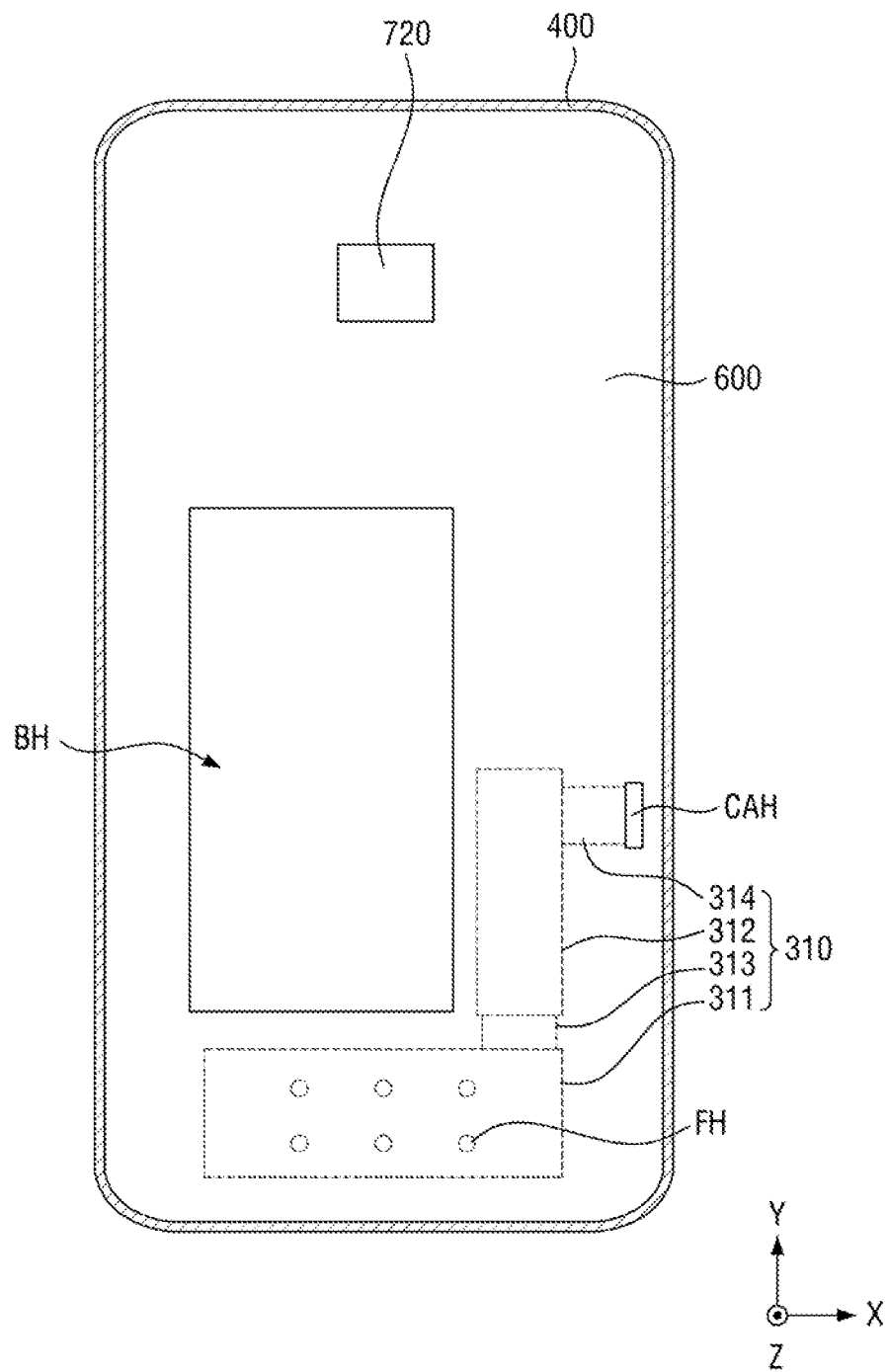
FIG. 4 is a plan view of a middle frame according to an exemplary embodiment.
Figure 5:
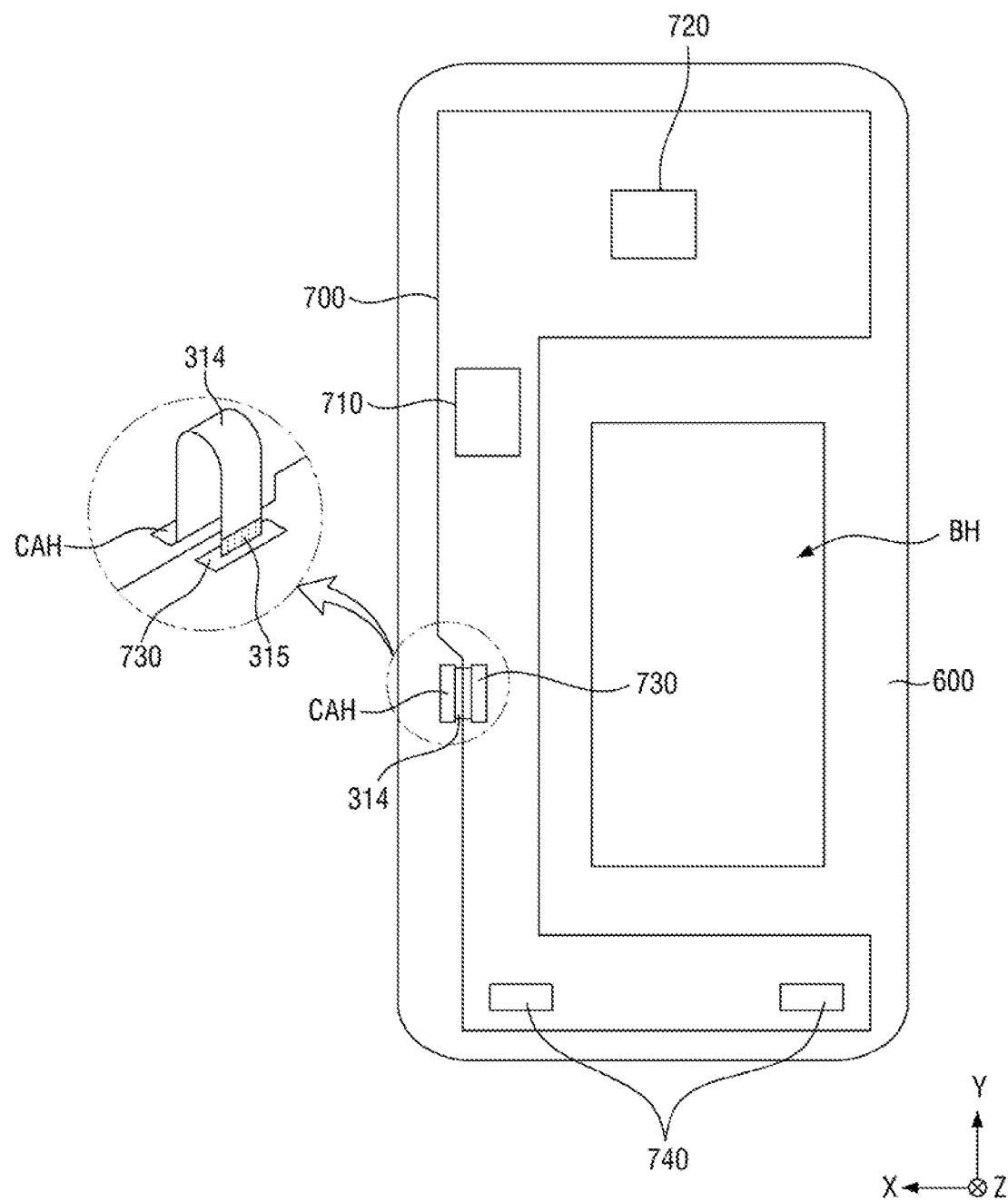
FIG. 5 is a bottom view of a middle frame and a main circuit board according to an exemplary embodiment.

FIG. 3 is a bottom view of a display panel according to an exemplary embodiment. FIG. 4 is a plan view of a middle frame according to an exemplary embodiment. FIG. 5 is a bottom view of the middle frame and a main circuit board according to an exemplary embodiment.

Hereinafter, a connection between the display circuit board 310 and the third circuit board 550 and a connection between the second connection cable 314 and the main connector 730 of the main circuit board 700 will be described in detail with reference to FIGS. 3 to 5. On the other hand, since FIG. 4 is a plan view and FIGS. 3 and 5 are bottom views, it should be noted that a left and a right of the display device 10 in FIG. 4 are reversed in FIGS. 3 and 5. In addition, for convenience of illustration, the display circuit board 310 is shown by a dotted line in FIG. 4, and the second connection cable 314 is shown by a dotted line in FIG. 4.

Referring to FIGS. 3 to 5, according to an embodiment, the display circuit board 310 includes a first circuit board 311, a second circuit board 312, and a first connection cable 313.

According to an embodiment, the first circuit board 311 is attached to one side of the display panel 300 and is bent toward the lower surface of the substrate of the display panel 300. The first circuit board 311 is fixed to fixing holes formed in the middle frame 600 as shown in FIG. 4 through fixing members.

According to an embodiment, the first circuit board 311 includes the display driver 320, the pressure sensing unit 330, a first connector 311a, and a second connector 311b. The display driver 320, the pressure sensing unit 330, the first connector 311a, and the second connector 311b are disposed on one surface of the first circuit board 311.

According to an embodiment, the first connector 311a is connected to one end of the first connection cable 313 connected to the second circuit board 312. Accordingly, the display driver 320 and the pressure sensing unit 330 mounted on the first circuit board 311 are electrically connected to the second circuit board 312 through the first connection cable 313.

According to an embodiment, the second connector 311b is connected to one end of the third circuit board 550 connected to the first force sensor 511, the second force sensor 512, the third force sensor 513, and the fourth force sensor 514. Therefore, the first force sensor 511, the second force sensor 512, the third force sensor 513, and the fourth force sensor 514 are electrically connected to the pressure sensing unit 330.

According to an embodiment, the second circuit board 312 includes the touch connector 312a, a first connection, connector 312b, and a second connection connector 312c. The first connection connector 312b and the second connection connector 312c are disposed on one surface of the second circuit board 312, and the touch connector 312a is disposed on the other surface of the second circuit board 312.

According to an embodiment, the touch connector 312a is connected to the touch connection portion at the end of the other side of the touch circuit board 210. Accordingly, the touch driver 220 is electrically connected to the second circuit board 312.

According to an embodiment, the first connection connector 312b is connected to the other end of the first connection cable 313 connected to the first circuit board 311. Accordingly, the display driver 320 and the pressure sensing unit 330 mounted on the first circuit board 311 are electrically connected to the second circuit board 312 through the first connection cable 313.

According to an embodiment, the second connection connector 312c is connected to one end of the second connection cable 314 connected to the main connector 730 of the main circuit board 700. Thus, the second circuit board 312 is electrically connected to the main circuit board 700 through the second connection cable 314.

According to an embodiment, a connector connection portion 315 is formed at the other end of the second connection cable 314. As shown in FIGS. 3 and 4, the connector connection portion 315 of the second connection cable 314 passes though the cable hole CAH of the middle frame 600 to extend to a lower portion of the middle frame 600. Since the first notch portion NTH1 is formed in a region inside the first force sensor 511 that corresponds to the cable hole CAH of the middle frame 600, the cable hole CAH is exposed without being covered by the first force sensor 511.

In addition, according to an embodiment, as shown in FIG. 5, since there is the gap between the middle frame 600 and the main circuit board 700, the connector connection portion 315 of the second connection cable 314, which passes through the cable hole CAH, passes through the gap between the middle frame 600 and the main circuit board 700 and extends to a lower portion of the main circuit board 700. Finally, the connector connection portion 315 of the second connection cable 314 is connected to the main connector 730 disposed on the lower surface of the main circuit board 700.

According, to an exemplary embodiment shown in FIGS. 3 to 5, for the cable hole CAH of the middle frame 600 to be not covered, the first notch portion NTH1 that has a notch shape is formed at one side of the first force sensor 511. Thus, the second connection cable 314 connected to the display circuit board 310 can extend to the lower portion of the middle frame 600 through the cable hole of the middle frame 600 and thus connects to the main connector 730 of the main circuit board 700. Therefore, the display circuit board 310 and the main circuit board 700 are stably connected.

Figure 6:
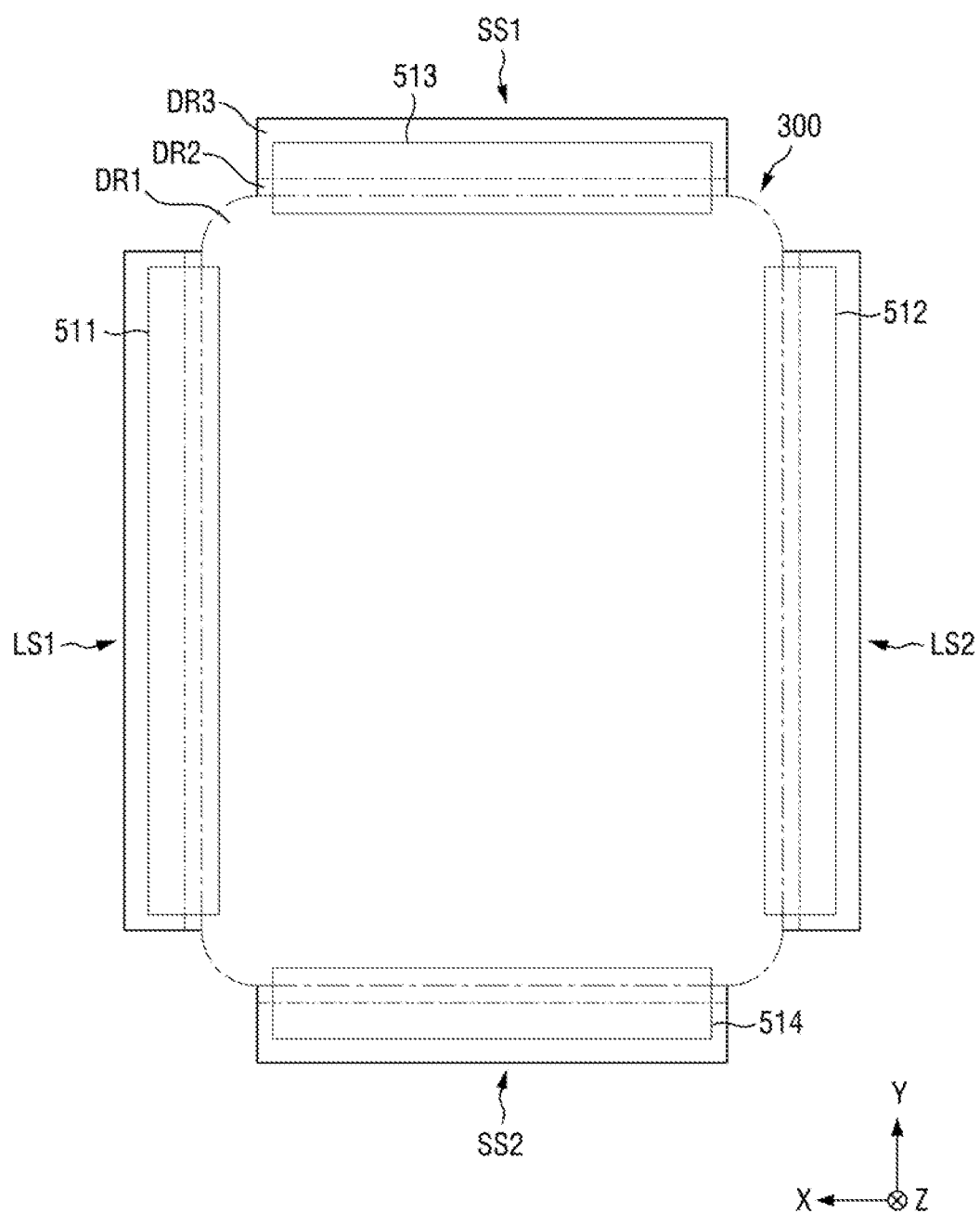
FIG. 6 is a bottom view of an arrangement relationship between a display panel and force sensors according to an exemplary embodiment.

FIG. 6 is a bottom view of an arrangement relationship between a display panel and a force sensor according, to an exemplary embodiment.

Referring to FIG. 6, according to an embodiment, the display panel 300 according to an exemplary embodiment includes the first region DR1, the second region DR2, and the third region DR3. For example, the second region DR2 extends along each of the first and second short sides SS1 and SS2 and each of the first and second long sides LS1 and LS2. The third region DR3 extends from the second region DR2 toward each of the first and second short sides SS1 and SS2 and each of the first and second long sides LS1 and LS2. However, embodiments of the present disclosure are not limited thereto, and the second region DR2 and the third region DR3 may have a frame shape that surrounds the first region DR1. A length of a long side of each of the second region DR2 and the third region DR3 is illustrated in FIG. 6 as being less than a length of each side of the first region DR1. However, embodiments of the present disclosure are not limited thereto, and the length of the long side of each of the second region DR2 and the third region DR3 extending along each side of the first region DR1 may be equal to the length of each side of the first region DR1.

According to an embodiment, in a process of fabricating the display device 10, the second region DR2 and the third region DR3 are bent from the first region DR1. For example, the first region DR1 of the display panel 300 corresponds to a flat portion as a main display region, the second region DR2 corresponds to a curved surface portion that extends from the first region DR1, and the third region DR3 corresponds to a vertical portion, i.e., side surfaces that extend downward from the end of the second region DR2. However, embodiments of the present disclosure are, not limited thereto, and the second region DR2 may have a flat portion inclined at an angle from the first region DR1, and the third region DR3 may have a curved surface portion that extends from the second region DR2. As described above, since the display panel 300 further includes the second region DR2 and the third region DR3 that extend from the first region DR1, the display device 10 can display an image on four side surfaces as well as an upper surface thereof.

In an exemplary embodiment, each of the first force sensor 511, the second force sensor 512, the third force sensor 513, and the fourth force sensor 514 is disposed below the display panel. Specifically, the first force sensor 511 is disposed adjacent to the first long side LS1 below the display panel 300 and extends in a second, Y-axis direction. The second force sensor 512 is disposed adjacent to the second long side LS2 below the display panel 300 and extends in the second, Y-axis direction. The third force sensor 513 is disposed adjacent to the first short side SS1 below the display panel 300 and extends in the first, X-axis direction. The fourth force sensor 514 is disposed adjacent to the second short side SS2 below the display panel 300 and extends in the first, X-axis direction. The first force sensor 511 and the second force sensor 512 face each other in the first, X-axis direction, and the third farce sensor 513 and the fourth force sensor 514 face each other in the second, Y-axis direction.

According to an embodiment, each of the first force sensor 511, the second force sensor 512, the third force sensor 513, and the fourth force sensor 514 are disposed on the edge of the first region DR1, the second region DR2, and the third region DR3. However, embodiments of the present disclosure are not limited thereto, and in other embodiments, each of the first force sensor 511, the second force sensor 512, the third force sensor 513, and the fourth force sensor 514 can be disposed in the second region DR2 and the third region DR3, or is disposed only in the third region DR3. Part of the first force sensor 511, the second force sensor 512, the third force sensor 513, and the fourth force sensor 514 are disposed on the edge of the first region DR1, and the remainder are disposed in the second region DR2 and the third region DR3. That is, the first force sensor 511, the second force sensor 512, the third force sensor 513, and the fourth force sensor 514 are disposed in different regions.

According to an embodiment, in a process of fabricating the display device 10, each of the first force sensor 511, the second force sensor 512, the third force sensor 513, and the fourth force sensor 514 is bent and assembled to correspond to the display panel 300. Accordingly, the first force sensor 511, the second force sensor 512, the third force sensor 513, and the fourth force sensor 514 can sense a pressure at the four edges of the upper surface and the four side surfaces of the display device.

Figure 7:
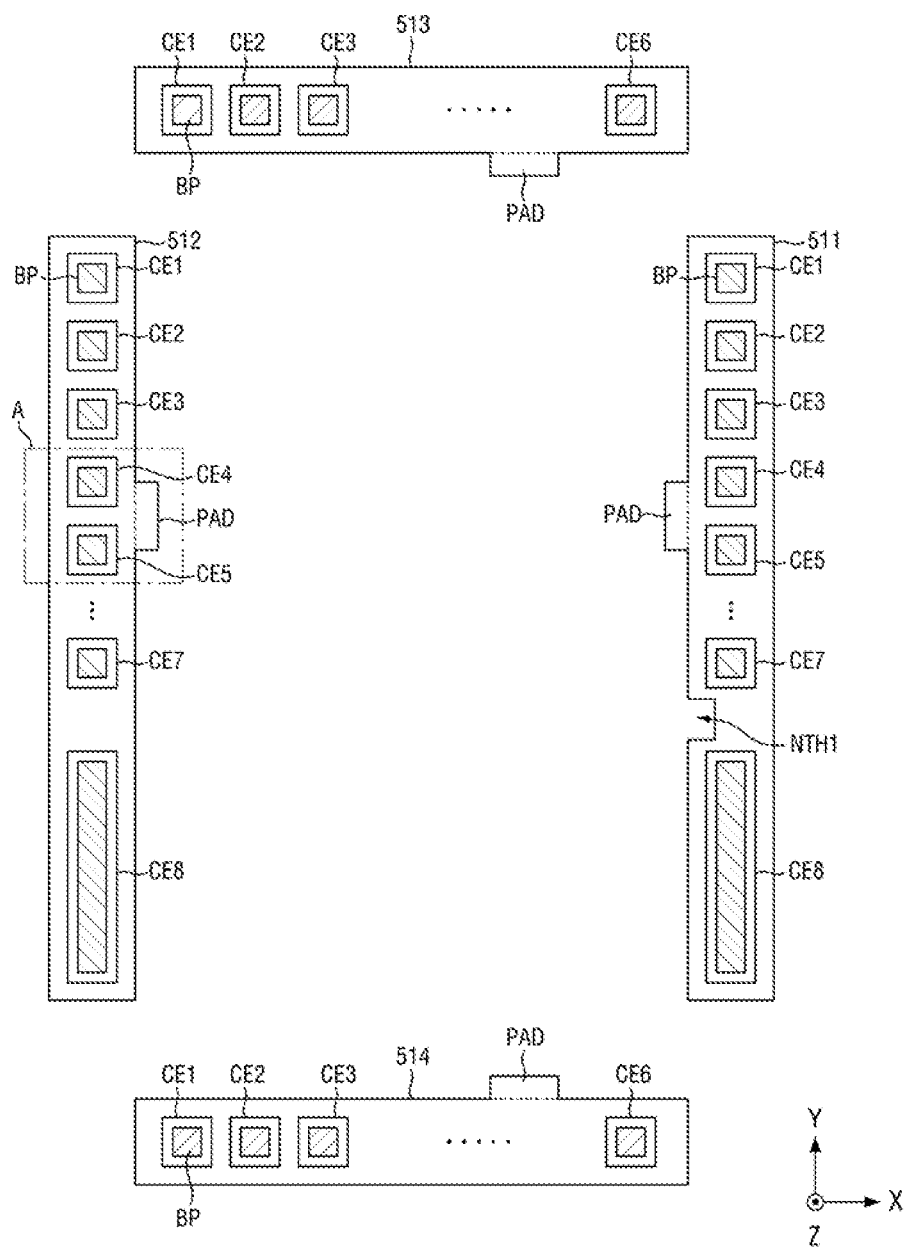
FIG. 7 is a plan view of a first force sensor, a second force sensor, a third force sensor, a fourth force sensor, and bumps according to an exemplary embodiment.

FIG. 7 is a plan view of the first force sensor, the second force sensor, the third force sensor, the fourth force sensor, and bumps according to an exemplary embodiment.

Referring to FIG. 7, according to an embodiment, the first force sensor 511 has a rectangular planar shape which has a short side in the first, X-axis direction and a long side in the second, Y-axis direction. However, embodiments of the present disclosure are not limited thereto, and the planar shape of the first force sensor 511 can vary according to applied positions thereof.

According to an embodiment, the first force sensor 511 includes a plurality of pressure sensing cells CE1 to CE8. The first force sensor 511 is illustrated in FIG. 7 as including eight pressure sensing cells CE1 to CE8, but the number of the pressure sensing cells CE1 to CE8 is not limited thereto.

According to an embodiment, the plurality of pressure sensing cells CE1 to CE8 can each independently sense a pressure at a corresponding position. Although the plurality of pressure sensing cells CE1 to CE8 are illustrated in FIG. 7 as being arranged in one column, embodiments of the present disclosure are not limited thereto. The plurality of pressure sensing cells CE1 to CE8 can be arranged in a plurality of columns as needed. In addition, the plurality of pressure sensing cells CE1 to CE8 are spaced apart from each other by a predetermined distance as shown in FIG. 7, or may be consecutively disposed.

According to an embodiment, the plurality of pressure sensing cells CE1 to CE8 have different areas according to use thereof. For example, the first to seventh pressure sensing cells CE1 to CE7 are used as physical buttons such as volume control buttons and a power supply button disposed along one side edge or at a side surface of the display device 10. An eighth pressure sensing cell CE8 can be used as a button that senses a squeezing pressure of a user. In this case, the eighth pressure sensing cell CE8 is wider in the X-axis direction than the first to seventh pressure sensing cells CE1 to CE7. In addition, the eighth pressure sensing cell CE8 is longer in a length, Y-axis direction than the first to seventh pressure sensing cells CE1 to CE7 of the first force sensor 511.

In addition, according to an embodiment, the first to seventh pressure sensing cells CE1 to CE7 used as the physical buttons are illustrated in FIG. 7 as having the same area, but embodiments of the present disclosure are not limited thereto. That is, the first to seventh pressure sensing cells CE1 to CE7 may have different areas. Alternatively, a first group of the first to seventh pressure sensing cells CE1 to CE7 may have the same area, and the remaining, second group of pressure sensing cells may have the same area that differs from the area of each of the first group of pressure sensing cells.

According to an embodiment, a plurality of bumps BP are disposed on the first to eighth pressure sensing cells CE1 to CE8 that overlap the first to eighth pressure sensing cells CE1 to CE8. The bumps BP function to press the first to eighth pressure sensing cells CE1 to CE8 according to a pressure from a user. Therefore, a user's pressure can be sensed by the first to eighth pressure sensing cells CE1 to CE8.

According to an embodiment, to increase the pressure applied to the first to eighth pressure sensing cells CE1 to CE8 by the plurality of bumps BP, each of the plurality of bumps BP has an area less than that of one of the first to eighth pressure sensing cells CE1 to CE8. Each of the plurality of bumps BP has an area less than that of a pressure sensing layer of each of the first to eighth pressure sensing cells CE1 to CE8.

According to an embodiment, the area of the bump BP is proportional to the area of the corresponding pressure sensing cell. For example, as shown in FIG. 7, since the area of the eighth pressure sensing cell CE8 is greater than the area of each of the first to seventh pressure sensing cells CE1 to CE7, the area of the bump BP on the eighth pressure sensing cell CE8 is greater than the area of each of the bumps BP on the first to seventh pressure sensing cells CE1 to CE7.

In addition, according to an embodiment, for the cable hole CAH of the middle frame 600 to be not covered, the first notch portion NTH1 is formed in a region inside the first force sensor 511 that corresponds to the cable hole CAH of the middle frame 600.

On the other hand, according to an embodiment, the second force sensor 512 and the bumps BP thereon differ from the first force sensor 511 and the bumps BP thereon in that the second force sensor 512 does not include the first notch portion NTH1. Thus, detailed descriptions of the second force sensor 512 and the bump BP will be omitted.

According to an embodiment, the third force sensor 513 has a rectangular planar shape that has a short side in the second, Y-axis direction and a long side in the first, X-axis direction. However, embodiments of the present disclosure are not limited thereto, and the planar shape of the third force sensor 513 may vary according to applied positions thereof.

According to an embodiment, the third force sensor 513 includes a plurality of pressure sensing cells CE1 to CE6. The third force sensor 513 is illustrated in FIG. 7 as including six pressure sensing cells CE1 to CE6, but the number of the pressure sensing cells CE1 to CE6 is not limited thereto.

According to an embodiment, the plurality of pressure sensing cells CE1 to CE6 can each independently sense a pressure of a corresponding position. Although the plurality of pressure sensing cells CE1 to CE6 are illustrated in FIG. 7 as being arranged in one row, embodiments of the present disclosure are not limited thereto. The plurality of pressure sensing cells CE1 to CE6 may be arranged in a plurality of rows as needed. In addition, the plurality of pressure sensing cells CE1 to CE6 are spaced apart from each other by a predetermined distance, or may be consecutively disposed.

According to an embodiment, the plurality of pressure sensing cells CE1 to CE6 have different areas according to use thereof. For example, the first to sixth pressure sensing cells CE1 to CE6 are used as physical buttons such as a call button, a camera button, and an Internet button, which are disposed at one side edge or the side surface of the display device 10.

In addition, although the first to sixth pressure sensing cells CE1 to CE6 used as the physical buttons are illustrated in FIG. 7 as having the same area, embodiments of the present disclosure are not limited thereto. That is, the first to sixth pressure sensing cells CE1 to CE6 can have different areas. Alternatively, a first group of some of the first to sixth pressure sensing cells CE1 to CE6 have a same area, and a remaining, second group of the pressure sensing cells have a same area that differs from the area of each of the first group of pressure sensing cells.

According to an embodiment, a plurality of bumps BP are disposed on the first to sixth pressure sensing cells CE1 to CE6 that overlap the first to sixth pressure sensing cells CE1 to CE6. The bumps BP function to press the first to sixth pressure sensing cells CE1 to CE6 according to a pressure from a user. Therefore, the pressure from a user can be sensed by the first to sixth pressure sensing cells CE1 to CE6.

Since the fourth force sensor 514 and the bumps BP are the same as the third force sensor 513 and the humps BP, a detailed description of the fourth force sensor 514 and the bumps BP will be omitted.

Figure 8:
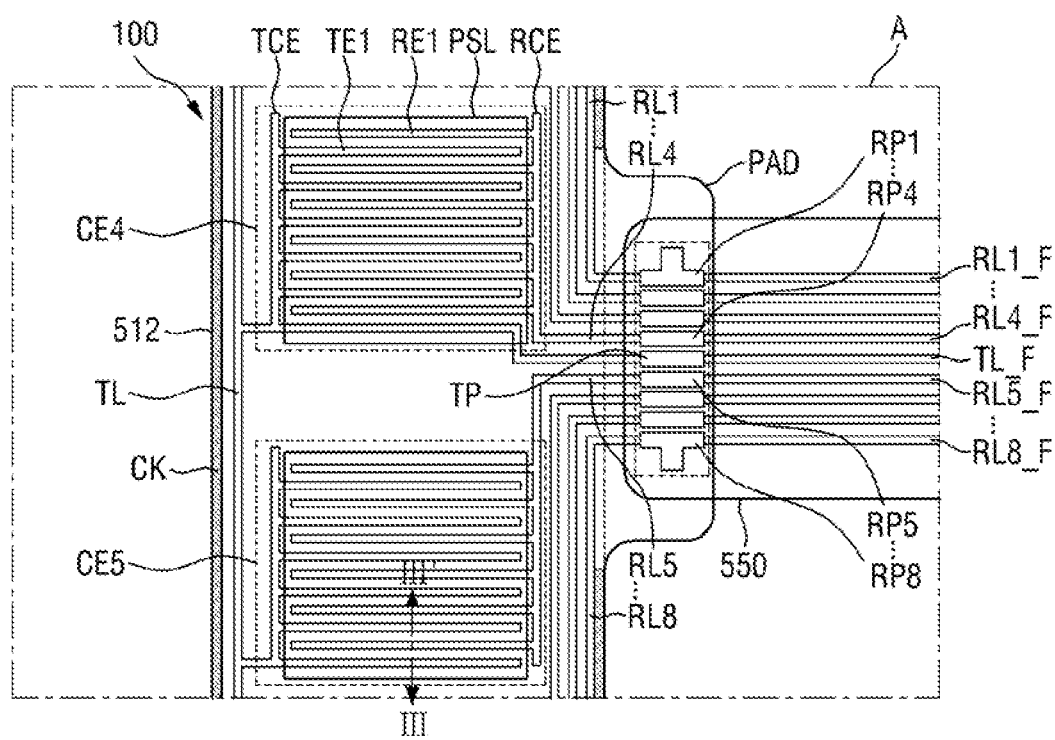
FIG. 8 is a plan view of region A of FIG. 7 in detail.
Figure 9:
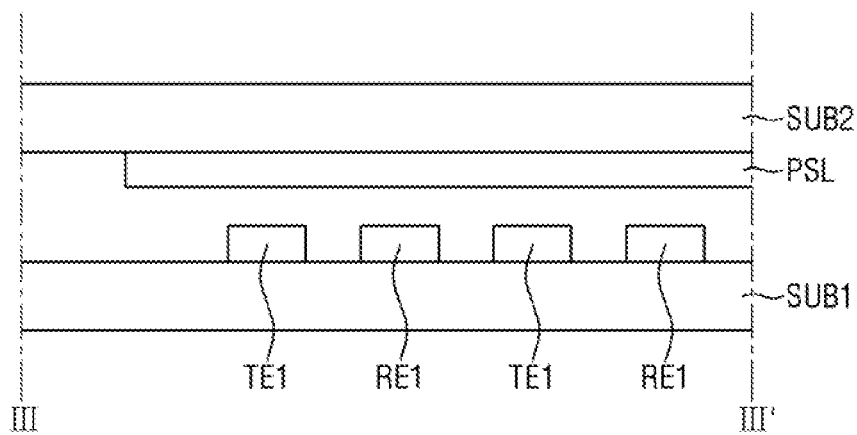
FIG. 9 is a sectional view of an example taken along line III-III' of FIG. 8.

FIG. 8 is a plan view of region A of FIG. 7 in detail, and FIG. 9 is a sectional view taken along line III-III' of FIG. 8.

Referring to FIGS. 8 and 9, according to an embodiment, the second force sensor 512 includes a first substrate SUB1, a second substrate SUB2, a driving line TL, first to eighth sensing lines to RL1 to RL8, a driving pad TP, first to eighth sensing pads RP1 to RP8, and first to eighth pressure sensing cells CE1 to CE8.

For convenience of illustration, only the fourth pressure sensing cell CE4, the fifth pressure sensing cell CE5, and a pad region PAD are illustrated in FIG. 8. For convenience of illustration, the second substrate SUB2 is omitted in FIG. 8.

According to an embodiment, the first substrate SUB1 and the second substrate SUB2 face each other. Each of the first substrate SUB1 and the second substrate SUB2 includes one of a polyethylene-based, polyimide-based, polycarbonate-based, polysulfone-based, polyacrylate-based, polystyrene-based, polyvinyl chloride-based, polyvinyl alcohol-based, polynorbonene-based, or polyester-based material. In an exemplary embodiment, the first substrate SUB1 and the second substrate SUB2 are composed of a polyethylene terephthalate (PET) film or a polyimide.

According to an embodiment, the pressure sensing cells CE1 to CE8 are disposed between the first substrate SUB1 and the second substrate SUB2. The driving line TL, the sensing lines RL1 to RL8, the driving pad TP, and the sensing pads RP1 to RP8 are disposed on a surface of the first substrate SUB1 that faces the second substrate SUB2.

According to an embodiment, each of the pressure sensing cells CE1 to CE8 is connected to the driving line TL and at least one of the sensing lines RL1 to RL8. For example, the pressure sensing cells CE1 to CE8 are commonly connected to driving line TL and are respectively connected to the sensing lines RL1 to RL8. As shown in FIG. 8, the fourth pressure sensing cell CE4 is connected to the driving line TL and the fourth sensing line RL4, and the fifth pressure sensing cell CE5 is connected to the driving line TL and the fifth sensing line RL5.

According to an embodiment, the driving line TL is connected to the driving pad TP, and the sensing lines RL1 to RL8 are respectively connected to the sensing pads RP1 to RP8. The first sensing line RL1 is connected to the first sensing pad RP1, the second sensing line RL2 is connected to the second sensing pad RP2, the third sensing line RL3 is connected to the third sensing pad RP3, and the fourth sensing line RL4 is connected to the fourth sensing pad RP4. The fifth sensing line RL5 is connected to the fifth sensing pad RP5, the sixth sensing line RL6 is connected to the sixth sensing pad RP6, the seventh sensing line RL7 is connected to the seventh sensing pad RP7, and the eighth sensing line RL8 is connected to the eighth sensing pad RP8.

According to an embodiment, the pad region PAD protrudes from one side of the first substrate SUB1. The one side of the first substrate SUB1 is a long side of the first force sensor 510. The pad region PAD is illustrated in FIG. 8 as protruding from a center of a long side of the first substrate SUB1, but embodiments of the present disclosure are not limited thereto. That is, in other embodiments, the pad region PAD may protrude from one end or the other end of the long side of the first substrate SUB1.

According to an embodiment, the driving pad TP and the sensing pads RP1 to RP8 are disposed in the pad region PAD. The driving pad TP and the sensing pads RP1 to RP8 are respectively connected to a driving lead line TL_F and sensing lead lines RL1_F to RL8_F of the third circuit board 550 through an anisotropic conductive film. The driving pad TP is connected to the driving lead line TL_F. The first sensing pad RP1 is connected to a first sensing lead line RL1_F. The second sensing pad RP2 is connected to a second sensing lead line RL2_F. The third sensing pad RP3 is connected to a third sensing lead line RL3_F. The fourth sensing pad RP4 is connected to a fourth sensing lead line RL4_F. The fifth sensing pad RP5 is connected to a fifth sensing lead line RL5_F. The sixth sensing pad RP6 is connected to a sixth sensing lead line RL6_F. The seventh sensing pad RP7 is connected to a seventh sensing lead line RL7_F. The eighth sensing pad RP8 is connected to the eighth sensing lead line RL8_F.

As shown in FIG. 3, according to an embodiment, since the third circuit board 550 is connected to the display circuit board 310, the third circuit board 550 is electrically connected to the pressure sensing unit 330 mounted on the display circuit board 310. The pressure sensing unit 330 transmits a driving voltage to the driving line TL through the driving lead line TL_F of the third circuit board 550 and the driving pad TP of the second force sensor 512, senses current values or voltage values from the sensing lines RP1 to RL8 through the sensing lead lines RL1_F to RL8_F connected to the sensing pads RP1 to RP8 of the second force sensor 512, and senses pressure applied to the pressure sensing cells CE1 to CE8.

According to an embodiment, the second force sensor 512 further includes a coupling layer CK disposed between the first substrate SUB1 and the second substrate SUB2 and that couples the first substrate SUB1 and the second substrate SUB2. The coupling layer CK includes a pressure-sensitive adhesive layer or an adhesive layer. The coupling layer CK is disposed along a peripheral portion of the first substrate SUB1 and the second substrate SUB2. In an exemplary embodiment, the coupling layer CK completely surrounds edges of the first substrate SUB1 and the second substrate SUB2 and seals an interior of the second force sensor 512. In addition, the coupling layer CK is a spacer which maintains a constant distance between the first substrate SUB1 and the second substrate SUB2. FIG. 8 illustrates an embodiment in which the coupling layer CK is not formed in the pad region PAD and thus does not overlap the driving line TL, the sensing lines RL1 to RLp, the pressure sensing cells CE1 to CEp, the driving pad TP, and the sensing pads RP1 to RPp, but embodiments of the present disclosure are not limited thereto. For example, in other embodiments, the coupling layer CK overlaps the driving line TL, the sensing lines RL1 to RLp, the pressure sensing cells CE1 to CEp, the driving pad TP, and the sensing pads RP1 to RPp.

According to an embodiment, when attaching the first substrate SUB1 and the second substrate SUB2, the coupling layer CK is first attached to one surface of the first substrate SUB1 or one surface of the second substrate SUB2 and is then attached to one surface of the other substrate. In another embodiment, a coupling layer CK is provided on each of one surface of the first substrate SUB1 and one surface of the second substrate SUB2, and the coupling layer CK of the first substrate SUB1 and the coupling layer CK of the second substrate SUB2 are attached to each other.

As shown in FIG. 8, according to an embodiment, each of the pressure sensing cells CE1 to CE8 includes a driving connection electrode TCE, a sensing connection electrode RCE driving electrodes TE1, sensing electrodes RE1, and a pressure sensing layer PSL.

According to an embodiment, the driving connection electrode TCE, the sensing connection electrode RCE, the driving electrodes TE1 and the sensing electrodes RE1 are disposed on the first substrate SUB1 and Pace the second substrate SUB2.

According to an embodiment, the driving connection electrode TCE is connected to the driving line TL and the driving electrodes TE1. Specifically, the driving connection electrode TCE is connected to the driving line TL at one end thereof in a length, Y-axis direction. The driving electrodes TE1 branch front the driving connection electrode TCE in a width, X-axis direction.

According to an embodiment, the sensing connection electrode RCE is connected to one of the sensing lines RL1 to RL8 and the sensing electrodes RE1. Specifically, the sensing connection electrode TCE is connected to one of the sensing lines RL1 to RL8 at one end thereof in the length, Y-axis direction. The sensing electrodes RE1 branched from the sensing connection electrode RCE in a width, X-axis direction.

According to an embodiment, the driving electrodes TE1 and the sensing electrodes RE1 are disposed on the same layer. The driving electrodes TE1 and the sensing electrodes RE1 are made of a same material. For example, the driving electrodes TE1 and the sensing electrodes RE1 include a conductive material such as silver (Ag) or copper (Cu). The driving electrodes TE1 and the sensing electrodes RE1 are formed on the first substrate SUB1 though a screen printing method.

According to an embodiment, the driving electrodes TE1 and the sensing electrodes RE1 are disposed adjacent to each other but are not connected to each other. The driving electrodes TE1 and the sensing electrodes RE1 extend parallel to each other. The driving electrodes TE1 and the sensing electrodes RE1 are alternately disposed in the length, Y-axis direction of the driving connection electrode TCE and the sensing connection electrode RCE. That is, the driving electrodes TE1 and the sensing electrodes RE1 are repeatedly disposed in the order of the driving electrode TE1, the sensing electrode RE1, the driving electrode TE1, and the sensing electrode RE1, etc., in the length, Y-axis direction of the driving connection electrode TCE and the sensing connection electrode RCE.

According to an embodiment, the pressure sensing layer PSL is disposed on one surface of the second substrate SUB2 and faces the first substrate SUB1. The pressure sensing layer PSL overlaps the driving electrodes TE1 and the sensing electrodes RE1.

According to an embodiment, the pressure sensing layer PSL includes a pressure-sensitive material and a polymer resin in which the pressure-sensitive material is disposed. The pressure-sensitive material includes metal rnicroparticles or metal nanoparticles formed of one or more of nickel, aluminum, titanium, tin, and copper, etc. For example, the pressure sensing layer PSL is made of a quantum tunneling composite (QTC).

According to an embodiment, when no pressure is applied to the second substrate SUB2 in a height, Z-axis direction of the second force sensor 512, as shown in FIG. 9, there is a gap between the pressure sensing layer PSL and the driving electrodes TE1 and the sensing electrodes RE1. That is, when no pressure is applied to the second substrate SUB2, the pressure sensing layer PSL is spaced apart from the driving electrodes TE1 and the sensing electrodes RE1.

According to an embodiment, when pressure is applied to the second substrate SUB2 in the height, Z-axis direction of the second force sensor 512, the pressure sensing layer PSL can come into contact with the driving electrodes TE1 and the sensing electrodes RE1. In this case, at least one of the driving electrodes TE1 and at least one of the sensing electrodes RE1 physically connects through the pressure sensing layer PSL, and the pressure sensing layer PSL functions as an electric resistor.

Therefore, according to an exemplary embodiment shown in FIGS. 8 and 9, in a pressure sensing cell of the second force sensor 512, since an area in which the pressure sensing layer PSL comes into contact with the driving electrodes TE1 and the sensing electrodes RE1 changes according to applied pressure, a resistance value of the sensing line electrically connected to the sensing electrodes RE1 changes. For example, as shown in FIG. 7, as pressure applied to the pressure sensing cell of the second force sensor 512 increases, a resistance value of the sensing line decreases. The pressure sensing unit 330 senses a change in current value or voltage value from the sensing lines RL1 to RL8 and thus senses a pressure applied by a user's hand.

In addition, although an embodiment of the second force sensor 512 has been described, since the first force sensor 511, the third force sensor 513, and the fourth force sensor 514 are substantially the same as the second force sensor 512 shown in FIGS. 8 and 9, detailed descriptions of the first force sensor 511, the third force sensor 513, and the fourth force sensor 514 will be omitted.

On the other hand, an above-described display device can be incorporated into various types of devices, such as a portable phone, a tablet personnel computer (PC), a laptop PC, a personal, digital assistant (PDA), etc. Therefore, a configuration described with reference to FIGS. 1 to 9 can be variously modified according to a type of the display device 10. The main processor 710 of the display device 10 can support various user interactions according to exemplary embodiments. Hereinafter, the main processor 710 may be referred to as a controller 710.

Figure 10:
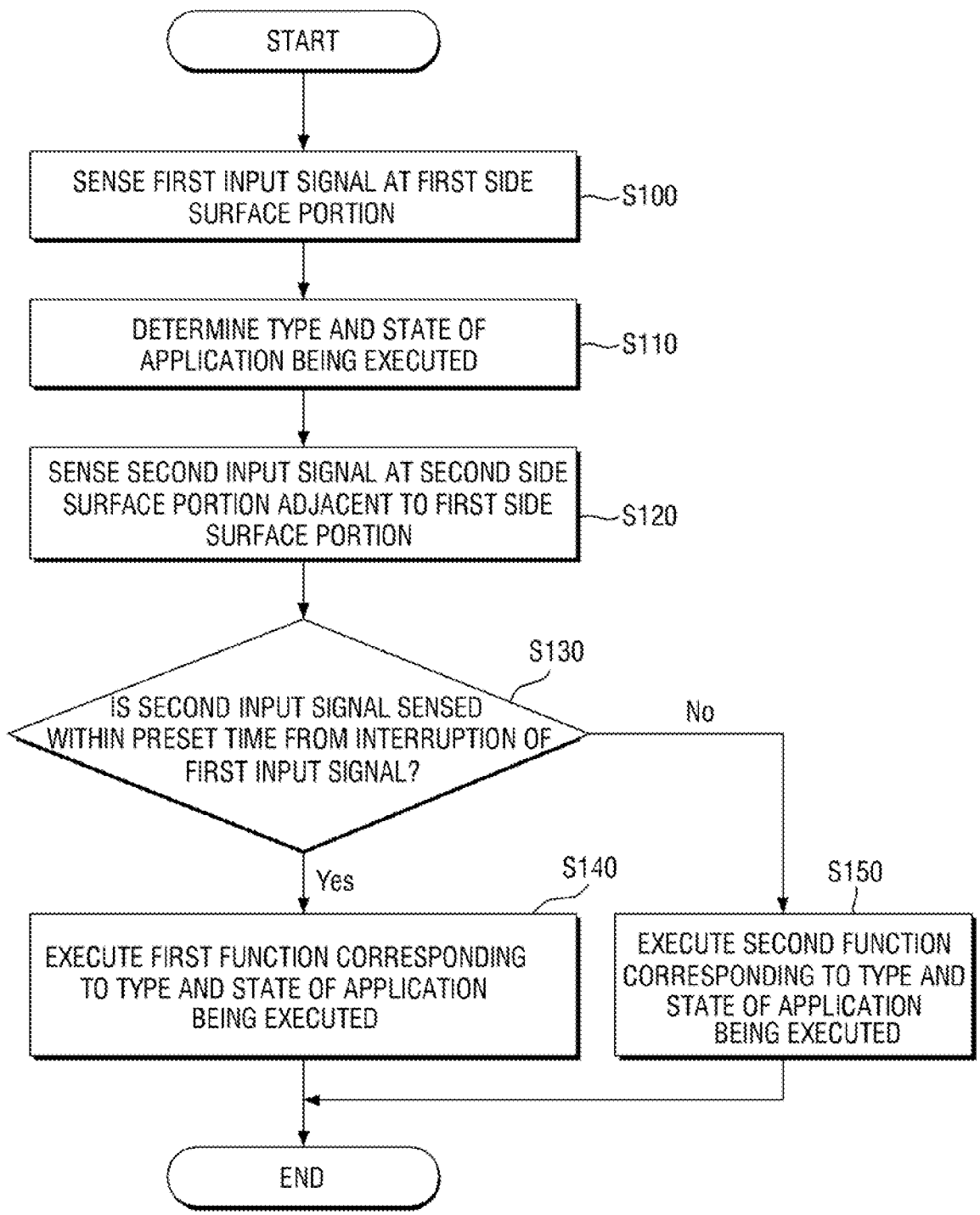
FIG. 10 is a flowchart of an operation process of a display device according to an exemplary embodiment.
Figure 11A:
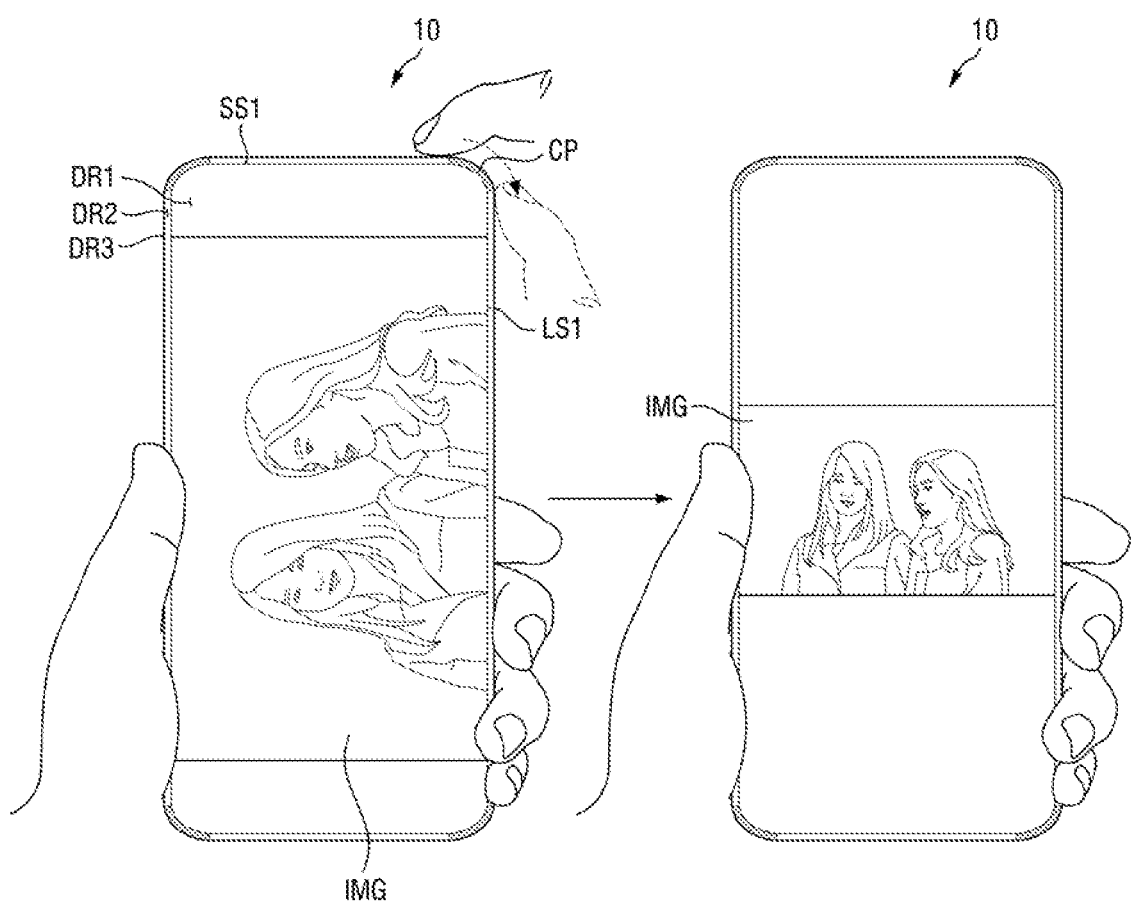
FIGS. 11A and 11B illustrate a photo album execution screen of a display device according to an embodiment.
Figure 11B:
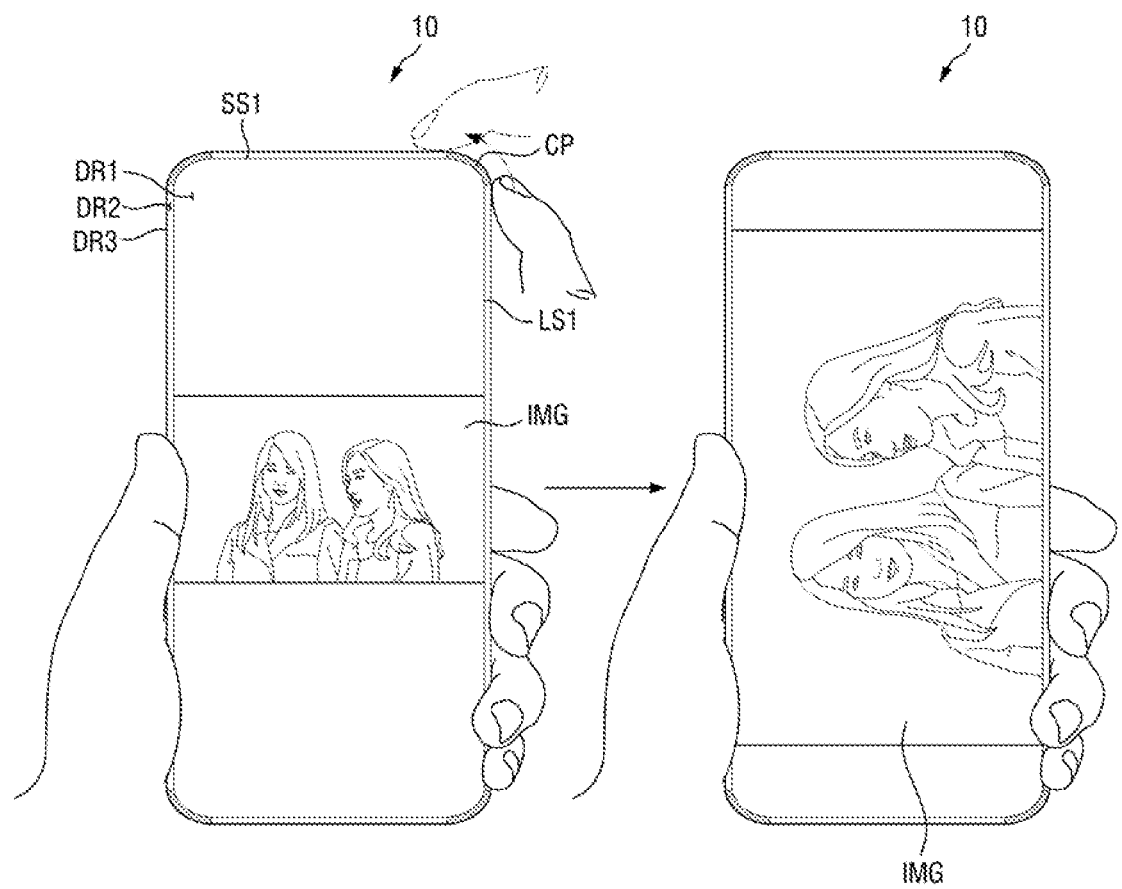

FIG. 10 is a flowchart of an operation process of a display device according to an exemplary embodiment. FIGS. 11A and 11B illustrate a photo album execution screen of a display device according to an embodiment.

Hereinafter, a user interaction method according to an exemplary embodiment will be described in detail with reference to FIGS. 1, 5 to 7, 10, 11A, and 11B. Hereinbelow, for convenience of explanation, the third region DR3 that extends from the first long side LS1 shall be referred to as DR3_LS1, the third region DR3 that extends from the second long side LS2 shall be referred to as DR3_LS2 the third region DR3 that extends from the first short side SS1 shall be referred to as DR3_SS1, and the third region DR3 that extends from the second short side SS2 shall be referred to as DR3_SS2.

According to an embodiment, the controller 710 senses a first input signal through at least one of the touch sensing device 200 or a force sensor, such as the third force sensor 513, which are disposed in a second side surface portion, such as the second region DR2 or the third region DR3_SS1 (S100).

For example, a user may touch with a finger the second region DR2 or the third region DR3_SS1. That is, a user swipes from a region of the first short side SS1 to a right edge region with the finger. A user's touch is sensed by the touch sensing device 200 in the second region DR2 or the third region DR3_SS1, or the third force sensor 513. However, according to an embodiment, when the user's touch is sensed through the third force sensor 513, the controller 710 determines whether a pressure intensity of the first input signal exceeds a preset pressure threshold. When the pressure intensity of the first input signal is less than or equal to the preset pressure threshold, the controller 710 determines that the first input signal is an unintended touch of a user. Accordingly, the controller 710 does not process the unintended user touch as an input signal, thereby reducing malfunction of the display device 10.

According to an embodiment, when the first input signal is sensed, the controller 710 determines a type and a state of an application which is being executed in the display device 10 (S110).

According to an embodiment, the display device 10 includes a storage unit. The storage unit stores a plurality of applications. For example, the applications can provide various services, such as a camera, a photo album, a music player, a radio, an Internet browser, an email reader, a phone, a message app, a recorder, a game, an electronic book, or schedule management. The applications may be installed by default or by a user and are used by a user in a usage process. The application includes a plurality of operations and different user interfaces (UIs) for each operation.

Figure 13:
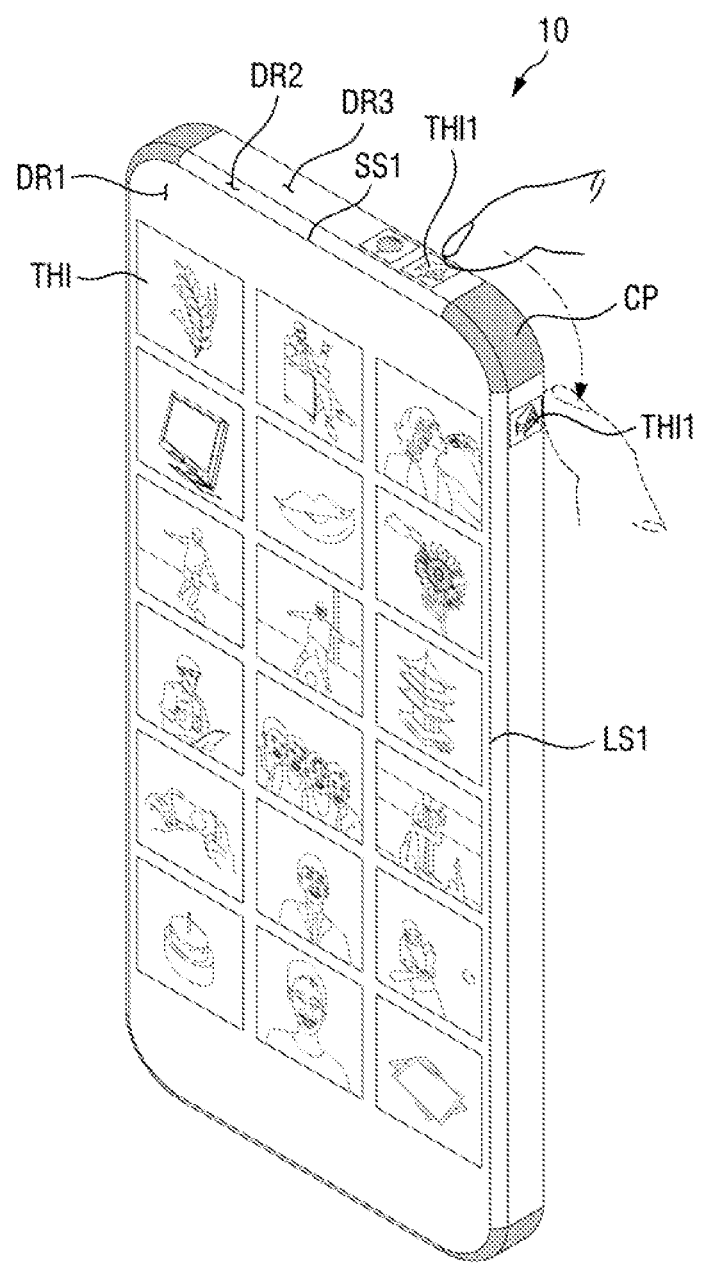
FIGS. 13 and 14 illustrate an operation of displaying a photo album of a display device according to an embodiment in the form of a thumbnail.

According to an embodiment, when an icon displayed on a screen of the display device 10 is selected, the controller 710 executes an application that corresponds to the selected icon. For example, when a user selects an icon corresponding to a photo album, the controller 710 displays a photo album application on the screen of the display device 10. Referring to FIG. 13 to be described below, when the photo album application is executed, the controller 710 displays a UI of a state of displaying a plurality of images THI in the form of thumbnails such that a user can quickly search for a desired image on the screen of the display device 10. Then, when the user touches one of the plurality of thumbnail images, the controller 710 displays a UI of a state of enlarging the selected thumbnail image and displays the selected thumbnail image as a whole image IMG on the screen of the display device 10. When the first input signal is sensed in the state, the controller 710 determines that a current state of the display device 10 is one in which the photo album application is being executed and the whole image IMG is displayed.

According to an embodiment, the controller 710 senses a second input signal through the touch sensing device 200 and the force sensor, such as the first force sensor 511, disposed on a first side surface portion, such as the second region DR2 or the third region DR3_LS1, that is adjacent to and connects with the second side surface portion, such as the second region DR2 or the third region DR3_SS1 (S120).

For example, according to an embodiment, a user can touch the second region DR2 or the third region DR3_LS1 with a finger after touching the second region DR2 or the third region DR3_SS1 of the display device 10. That is, a user can swipe from an upper edge region of the first long side LS1 to another region with the finger as the second input signal. Here, the first short side SS1 and the first long side LS1 are adjacent to and connected with each other. The controller 710 recognizes the second input signal, wherein the signal is sensed by the touch sensing device 200 on the second region DR2 or the third region DR3_LS1, or is sensed by the first force sensor 511 on the second region DR2 or the third region DR3_LS1, after the first input signal is sensed in the second region DR2 or the third region DR3_SS1. According to an embodiment, the controller 710 may display a guide mark on a first force sensor 511 and a second force sensor 512 according to the type and the state of the application. For example, the controller 710 may display a guide mark on a first upper curved surface portion of the first force sensor 511 and a second upper curved surface portion of the second force sensor 512 according to the type and the state of the application.

According to an embodiment, the controller 710 determines whether the second input signal is sensed within a preset time from an interruption of the first input signal (S130).

According to an exemplary embodiment, the second region DR2 or the third region DR3_SS1, and the second region DR2 or the third region DR3_LS1 of the display device 10 are connected to each other. However, embodiments of the present disclosure are not limited thereto, and in other embodiments, the corner portion CP is provided between the second region DR2 or the third region DR3_SS1 and the second region DR2 or the third region DR3_LS1. The corner portion CP is a non-display region. In addition, the corner portion CP does not include the touch sensing device 200 or the force sensors 511, 512, 513, and 514.

According to an embodiment, when the second region DR2 or the third region DR3_SS1 and the second region DR2 or the third region DR3_LS1 are display regions connected to each other, the preset time is close to zero seconds. On the other hand, when the corner portion CP is provided between the second region DR2 or the third region DR3_SS1 and the second region DR2 or the third region DR3_LS1, the preset time is increased in proportion to a length of the corner portion CP. The corner portion CP is curved in a plan view.

According to an embodiment, when the second input signal is sensed within the preset time from the interruption of the first input signal, the controller 710 executes a first function that corresponds to the type and the state of the application being executed (S140).

An embodiment of an above-described operation of displaying a whole image of a photo album application will be described. When the second input signal is sensed within the preset time from the interruption of the first input signal, the controller 710 determines the two signals to be one signal. That is, a state in which a user swipes from a region of the first short side SS1 to the right edge region with the finger and a state in which the user swipes from the upper edge region of the first long side LS1 to another region are combined and recognized as a state of rotating a virtual wheel clockwise. Accordingly, the controller 710 executes a function of rotating a displayed image. As shown in FIG. 11A, the controller 710 rotates an image displayed in landscape mode clockwise by 90° to display the image in portrait mode.

On the other hand, according to an embodiment, a state in which a user swipes from a region of the first long side LS1 to the upper edge region with the finger and a state in which the user swipes from the right edge region of the first short side SS1 to another region can be combined and recognized as a state of rotating a virtual wheel counterclockwise. Accordingly, the controller 710 executes a function of rotating a displayed image. As shown in FIG. 11B, the controller 710 rotates an image displayed in portrait mode counterclockwise by 90° to display the image in landscape mode.

According to an embodiment, when the second input signal is not sensed within the preset time from the interruption of the first input signal, the controller 710 executes a second function that corresponds to the type and the state of the application that is being executed (S150).

An embodiment of an above-described operation of displaying a whole image of a photo album application will be described. When no second input signal is sensed within the preset time from the interruption of the first input signal, the controller 710 determines that the first input signal itself is one input signal. For example, when a user does not touch the first long side LS1 after swiping from a region of the first short side SS1 to the right edge region with the finger, the controller 710 executes a function of turning a displayed image. The controller 710 determines a swipe gesture sensed at the first short side SS1 as one input signal and displays a previous image of the displayed image on the screen.

Hereinafter, other exemplary embodiments of an exemplary embodiment will be described. In exemplary embodiments, descriptions of the same configuration as a previously described exemplary embodiment will be omitted or simplified, and differences will be mainly described.

Figure 12:
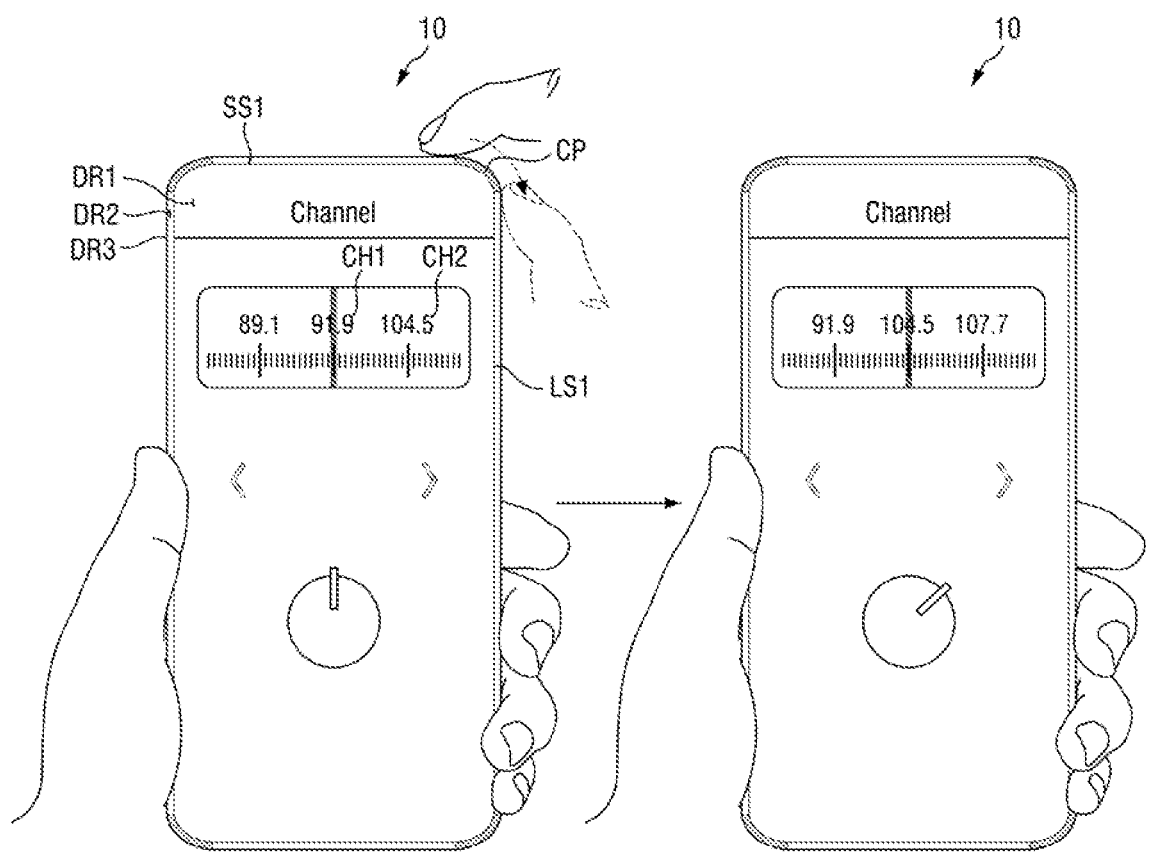
FIG. 12 illustrates a radio execution screen of a display device according to an embodiment.

FIG. 12 illustrates a radio execution screen of a display device according to an embodiment.

Referring to FIG. 12, an exemplary embodiment differs from an exemplary embodiment shown in FIGS. 11A and 11B in that the application being executed is a radio rather than a photo album.

Specifically, according to an embodiment, when the second input signal is sensed within the preset time from the interruption of the first input signal, the controller 710 determines the two signals as one input signal. That is, a state in which a user swipes from a region of the first short side SS1 to the right edge region with the finger and a state in which the user swipes from the upper edge region of the first long side LS1 to another region are combined and recognized as a state of rotating a virtual wheel clockwise. Accordingly, the controller 710 executes a function of changing the radio channel being used. As shown in FIG. 12, the controller 710 changes a frequency from a first channel (91.9 MHz) CH1 being used to a second channel (104.5 MHz) CH2.

On the other hand, according to an embodiment, a state in which a user swipes from a region of the first long side LS1 to the upper edge region with the finger and a state in which the user swipes from the right edge region of the first short side SS1 to another region may be combined and recognized as, a state of rotating a virtual wheel counterclockwise. Accordingly, the controller 710 changes the radio channel being used. In addition, the controller 710 changes a frequency from the second channel (104.5 MHz) CH2 being used to the first channel (91.9 MHz) CH1.

According to an embodiment, when no second input signal is sensed within the preset time from the interruption of the first input signal, the controller 170 determines that the first input signal itself is one input signal. For example, when a user does not touch the first long side LS1 after a state in which a user swipes from a region of the first short side SS1 to the right edge region with the finger, the controller 710 executes a function of adjusting a volume. In addition, the controller 710 determines a swipe gesture sensed at the first short side SS1 as one input signal and increases a volume.

Figure 14:
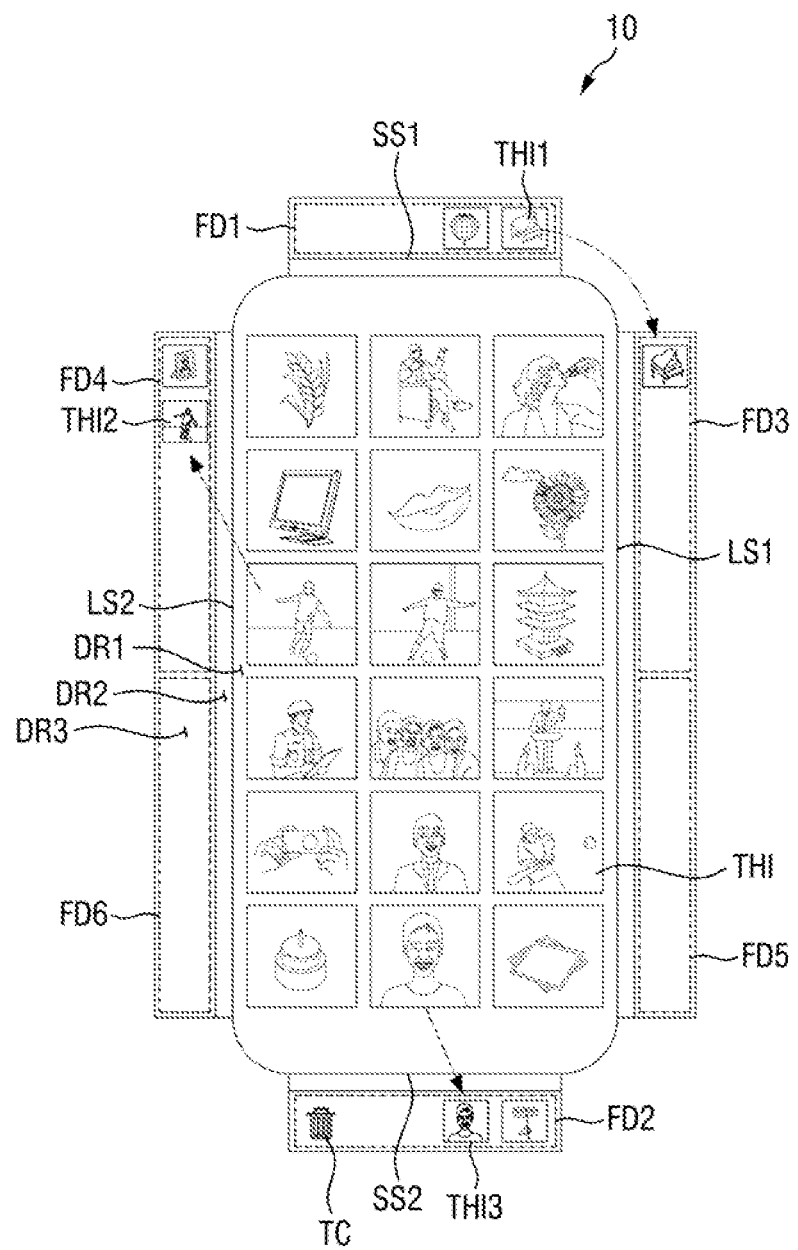

FIGS. 13 and 14 illustrate an operation of displaying a photo album of a display device in the form of a thumbnail.

Referring to FIGS. 13 and 14, a present exemplary embodiment differs from an exemplary embodiment shown in FIGS. 11A and 11B in that a state of the photo album application being executed in the display device is a state of displaying thumbnails rather than displaying a whole image.

Specifically, according to an embodiment, when the second input signal is sensed within the preset time from the interruption of the first input signal, the controller 710 determines the two signals are one input signal. That is, a state in which a user swipes from a region of the first short side SS1 to the right edge region with a finger and a state in which the user swipes from the upper edge region of the first long side LS1 to another region may be combined and recognized as a state of dragging and dropping a selected object. Therefore, the controller 710 drags a thumbnail image THI1 displayed in the third region DR3_SS1 and drops and displays the thumbnail image THI1 in the third region DR3_LS1.

According to an embodiment, when a state of displaying a thumbnail is entered from a state in which the photo album application is executed, the controller 710 displays the plurality of images THI stored in the storage unit as thumbnail images on a screen of the upper surface DR1.

According to an embodiment, the controller 710 recognizes a third region DR3_SS1 that extends from a first side of the upper surface DR1, a third region DR3_SS2, a third region DR3_LS1, and a third region DR3_LS2 as separate folders. For example, a user can designate the third region DR3_SS1 as a first folder FD1. A user can designate the third region DR3_SS2 as a second folder FD2. A user can designate, the third region DR3_LS1 as a third folder FD3. A user can designate the third region DR3_LS2 as a fourth folder FD4. However, a user can arbitrarily designate the number of the folders. For example, the third region DR3_LS1 and the third region DR3_LS2 can be designated to further include a fifth folder FD5 and a sixth folder FD6, respectively.

According to an embodiment, when a user drags an image THI2 from the plurality of thumbnail images displayed on the upper surface DR1 and drops the selected image THI2 in the third region DR3_LS2, the controller 710 stores the selected image in the fourth folder FD4. In this case, the image THI2 may be resized to correspond to the third region DR3_LS2. Similarly, when a user drags an image THI3 from the plurality of thumbnail images displayed on the upper surface DR1 and drops the selected image THI3 in the third region DR3_SS2, the controller 710 stores the selected image THI3 in a second folder FD2. In addition, when a user drags and drops the image THI3 near a wastebasket object TC displayed in the third region DR3_SS2, the controller 710 deletes the selected image THI3.

As described above, according to an embodiment, a user can drag the selected thumbnail image THI1 displayed in the third region DR3_SS1 and drop the thumbnail image THI1 in the third region DR3_LS1. When the second input signal is sensed within the preset time from the interruption of the first input signal, the controller 710 immediately moves the selected thumbnail image THI1 from the first folder FD1 to the third folder FD3. As a result, a user can intuitively move the misclassified image THI1 to a correct folder.

Figure 15:
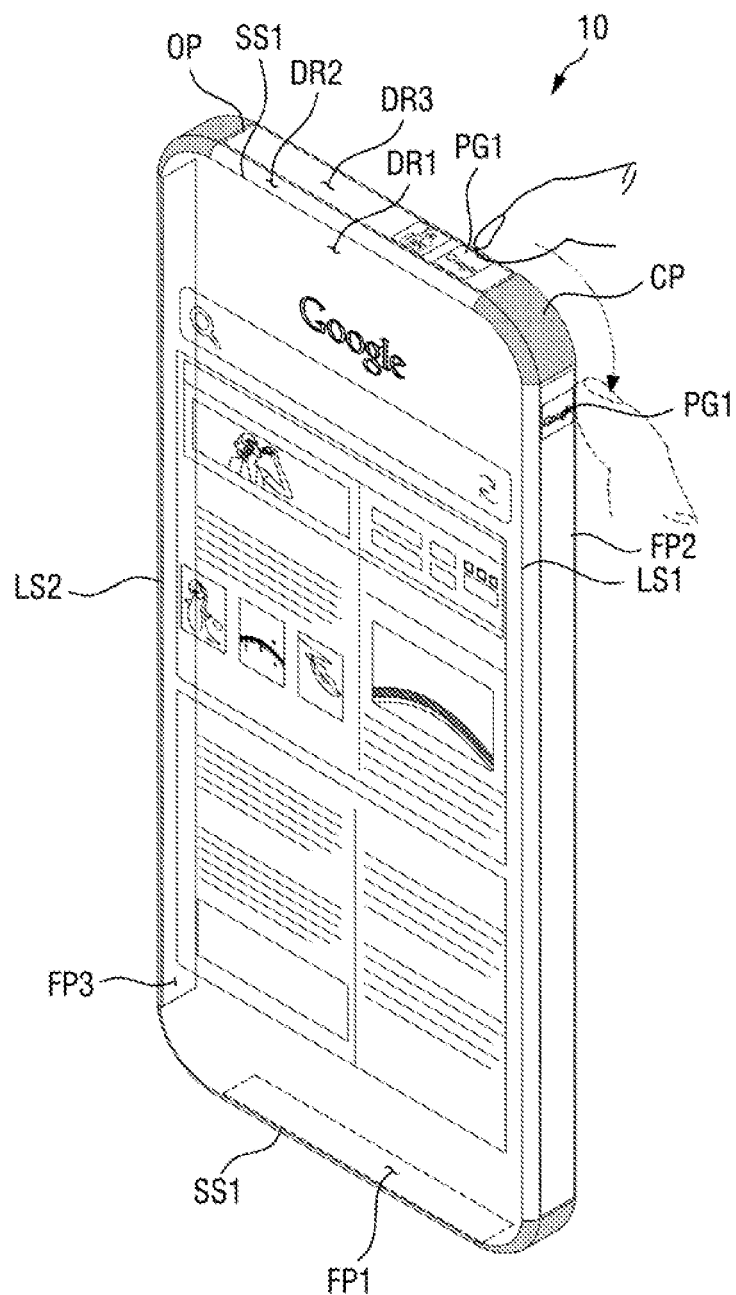
FIG. 15 illustrates an Internet browser execution screen of a display device according to an embodiment.

FIG. 15 illustrates an Internet browser execution screen of the display device according to an embodiment.

Referring to FIG. 15, a present exemplary embodiment differs from an exemplary embodiment shown in FIG. 14 in that an application being executed in the display device is an Internet browser rather than a photo album.

Specifically, according to an embodiment, when the second input signal is sensed within the preset time from the interruption of the first input signal, the controller 710 determines the two signals to be one input signal. That is, a state in which a user swipes from a region of the first short side SS1 to the right edge region with the finger and a state in which the user swipes from the upper edge region of the first long side LS1 to another region are combined and recognized as a state of dragging, and dropping a selected object PG1. Therefore, the controller 710 drags the selected object PG1 displayed in the third region DR3_SS1 and drops and displays the selected object PG1 in the third region DR3_LS1.

According to an embodiment, the controller 710 recognizes a third region DR3_SS1, a third region DR3_SS2, a third region DR3_LS1, and a third region DR3_LS2 as separate lists. For example, a user can designate the third region DR3_SS1 as a list OP. The user can designate the third region DR3_SS2 as a first favorite list FP1. The user can designate the third region DR3_LS1 as a second favorite list FP2. The user can designate the third region DR3_LS2 as a third favorite list FP3.

As described above, according to an embodiment, when a user drags the selected object PG1 displayed in the third region DR3_SS1 and drops the selected object PG1 in the third region DR3_LS1, the controller 710 substantially immediately moves the selected object PG1 from the opened list OP to the second favorite list FP2 when the second input signal is sensed within the preset time from the interruption of the first input signal. Therefore, the user can intuitively move items from an opened list to a favorites list.

Figure 16:
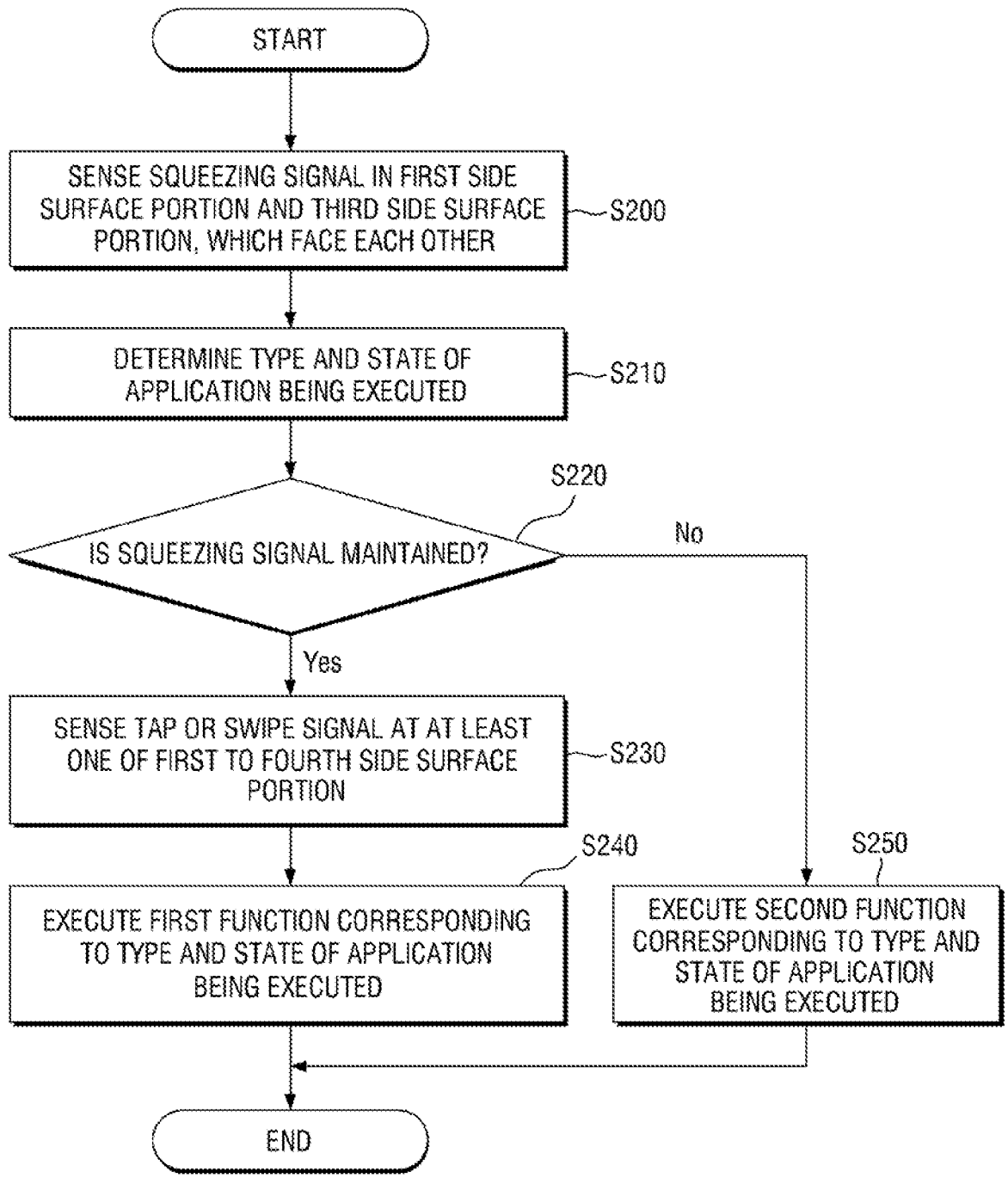
FIG. 16 is a flowchart of an operation process of a display device according to another exemplary embodiment.
Figure 17:
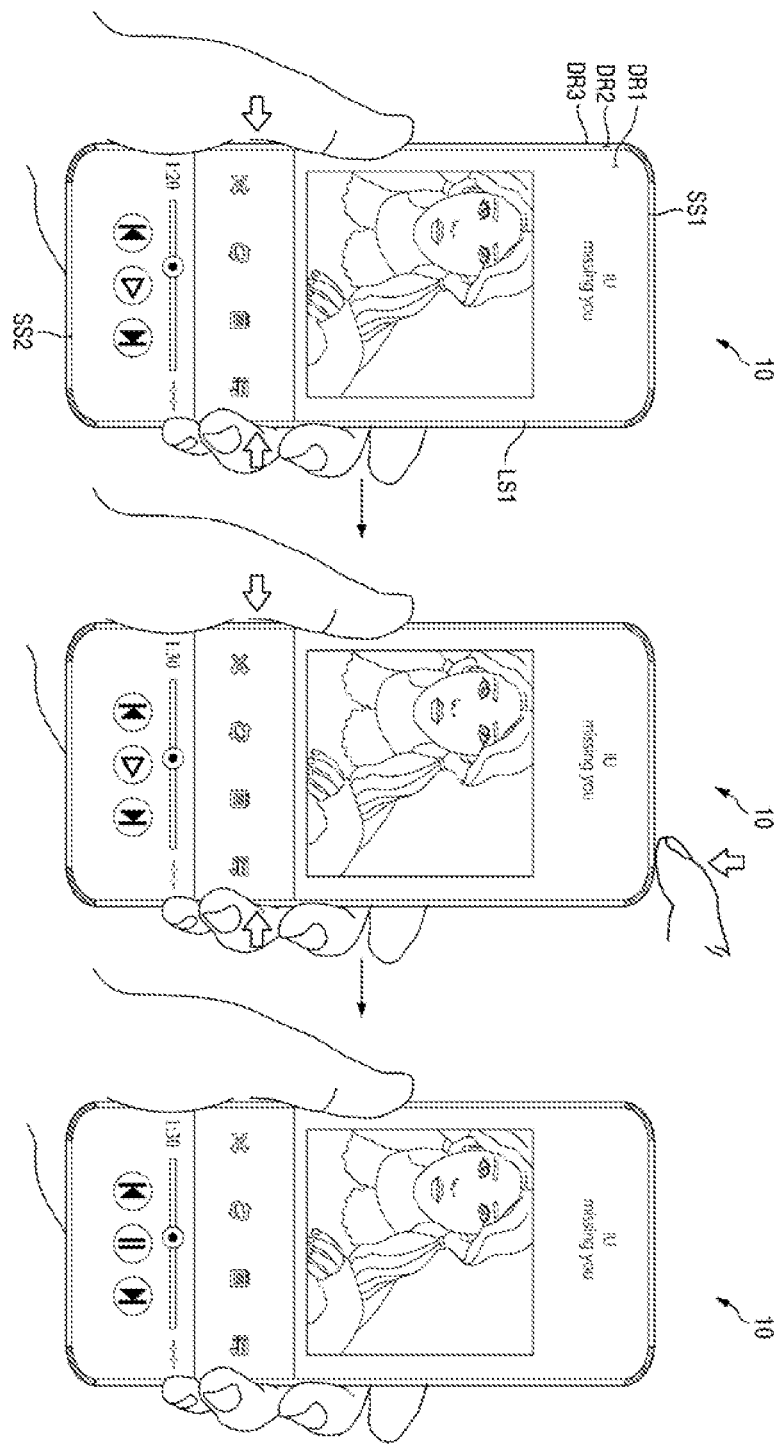
FIG. 17 illustrates a music player execution screen of a display device according to an embodiment.

FIG. 16 is a flowchart of an operation process of a display device according to another exemplary embodiment. FIG. 17 illustrates a music player execution screen of a display device according to an embodiment.

Hereinafter, a user interaction method according to another exemplary embodiment will be described in detail with reference to FIGS. 1, 5 to 7, 16, and 17.

According to an embodiment, the controller 710 senses a first input signal through force sensors, such as the first force sensor 511 and the second force sensor 512, disposed in a first side surface portion, such as a second region DR2 or a third region DR3_LS1, and a third side surface portion, such as a second region DR2 or a third region DR3_LS2, which are opposite to each other (S200).

According to an exemplary embodiment, the display device 10 includes a display panel that includes an upper surface, such as a first region DR1, a first side surface portion, such as a second region DR2 or a third region DR3_LS1, that extend from a first side of the upper surface, a second side surface portion, such as a second region DR2 or a third region DR3_SS1, that extend from a second side that connects with the first side, a third side surface portion, such as a second region DR2 or a third region DR3_LS2, that extend from a third side opposite to the first side, and a fourth side surface portion, such as a second region DR2 or a third region DR3_SS2, that extend from a fourth side opposite to the second side. The display device 10 includes a force sensor, such as the first force sensor 511, disposed in the first side surface portion, a force sensor, such as the third force sensor 513, disposed in the second side surface portion, a force sensor, such as the second force sensor 512, disposed in the third side surface portion, and a force sensor, such as the fourth force sensor 514, disposed in the fourth side surface portion.

According to an embodiment, a user concurrently applies pressure to the second region DR2 or the third region DR3_LS1 and the second region DR2 or the third region DR3_LS2. That is, the user concurrently grips the second region DR2 or the third region DR3_LS1 and the second region DR2 or the third region DR3_LS2. The controller 710 senses a squeezing operation of the user as a first input signal using the first force sensor 511 and the second force sensor 512. However, when a touch of the user is sensed through the first force sensor 511 and the second force sensor 512, the controller 710 determines whether a pressure intensity of the squeezing signal exceeds a preset pressure threshold. When the pressure intensity of the squeezing signal is less than or equal to the preset pressure threshold, the controller 710 determines that squeezing signal is an unintended touch of the user. Accordingly, the controller 710 does not process the unintended user touch as an input signal, thereby reducing malfunction of the display device 10.

According to an embodiment, when the squeezing signal is sensed as the first input signal, the controller 710 determines a type and a state of an application being executed in the display device 10 (S210).

According, to an embodiment, the display device 10 includes a storage unit. The storage unit stores a plurality of applications. For example, the applications provide various services, such as a camera, a photo album, a music player, a radio, an Internet browser, an email reader, a phone, a message app, a recorder, a game, an electronic book, or schedule management. The applications may be installed by default or by a user and are used by a user in a usage process. The application includes a plurality of operations and includes different UIs for each operation.

According to an embodiment, when an object displayed on a screen of the display device 10 is selected, the controller 710 executes art application that corresponds to the selected object. For example, when a user selects an object that corresponds to a music player, the controller 710 displays a music player application on the screen of the display device 10. According to an exemplary embodiment, when the music player application is executed, the controller 710 displays a UI of a playlist displaying operation that displays a stored music list such that a user can quickly search for desired music. Thereafter, when the user touches a piece of music displayed in the playlist, the controller 710 displays a UI of a state of reproducing the selected piece of music on the screen of the display device 10. When a squeezing signal is sensed in the state, the controller 710 determines that a current state of the display device 10 is a state in which the music player application is being executed, and plays the selected music.

According to an embodiment, the controller 710 determines whether the squeezing signal is maintained with respect to the first side surface portion, such as the second region DR2 or the third region DR3_LS1, and the third side surface portion, such as the second region DR2 or the third region DR3_LS2 (S220). Next, the controller 710 senses a tap or swipe signal as a second input signal through at least one of the touch sensing device 200 and force sensors, such as the first force sensor 511, the second force sensor 512, the third force sensor 513, or the fourth force sensor 514, which are disposed in the first side surface portion, the second side surface portion, such as the second region DR2 or the third region DR3_SS1, the third side surface portion, and the fourth side surface portion, such as the second region DR2 or the third region DR3_SS2 (S230).

For example, according to an embodiment, suppose a user touches a partial region of the third region DR3_SS1 while maintaining a squeezing action with respect to the second region DR2 or the third region DR3_LS1 and the second region DR2 or the third region DR3_LS2. That is, the user taps a right edge region of the first short side SS1 with a finger. Here, the first short side SS1 and the first long side LS1 are disposed adjacent to and are connected to each other, and the first short side SS1 and the second long side LS2 are disposed adjacent to and are connected to each other. In a state in which a squeezing signal sensed in the second region DR2 or the third region DR3_LS1 and the second region DR2 or the third region DR3_LS2 is maintained, the controller 710 determines the tap signal as the second input signal, where the signal is sensed by the touch sensing device 200 in the second region DR2 or the third region DR3_SS1 or the third force sensor 513.

According to an embodiment, in a state in which a squeezing signal with respect to the first side surface portion, such as the second region DR2 or the third region DR3_LS1, and the third side surface portion, such as the second region DR2 or the third region DR3_LS2, is maintained, when a tap or swipe signal, i.e., the second input signal is sensed with respect to at least one of the first side surface portion, the second side surface portion, such as the second region DR2 or the third region DR3_SS1, the third side surface portion, or the fourth side surface portion, such as the second region DR2 or the third region DR3_SS2 the controller 710 executes a first function that corresponds to a type and a state of an application being executed (S240).

An embodiment of a state of reproducing music of the above-described music player application will be described. In a state in which the squeezing signal with respect to the first side surface portion and the third side surface portion is maintained, when a tap or swipe signal is sensed with respect to at least one of the first to fourth side surface portions, the controller 710 determines the two signals to be one signal. That is, a state in which the user concurrently grips the first side surface portion and the third side surface portion and a state in which the user taps or swipes at least one of the first to fourth side surface portions are combined and recognized as a state of pushing a button. Accordingly, the controller 710 executes a function of reproducing or stopping music being played. As shown in FIG. 17, when the above-described condition is satisfied, the controller 710 stops the music being played. Since a state of reproducing stopped music is the same as the above-described operation, a detailed description thereof will be omitted.

According to an embodiment, in a state in which a squeezing signal, i.e., the first input signal with respect to the first side surface portion, such as the second region DR2 or the third region DR3_LS1, and the third side surface portion, such as the second region DR2 or the third region DR3_LS2, is not maintained, when a tap or swipe signal, i.e., the second input signal is sensed with respect to at least one of the first to fourth side surface portions, the controller 710 executes a second function that corresponds to a type and a state of an application being executed (S250).

An embodiment of a state of reproducing music of the above-described music player application will be described. When a squeezing signal is not maintained after the squeezing signal is sensed, the controller 710 determines the squeezing signal itself as one input signal. For example, after squeezing the first and third side surface portions, when the user does not maintain the squeezing action, the controller 710 executes a sleep mode function of turning off a screen.

Hereinafter, other exemplary embodiments of another exemplary embodiment will be described. In exemplary embodiments, descriptions of a configuration that is the same as a previously described exemplary embodiment will be omitted or simplified, and differences will be mainly described.

Figure 18:
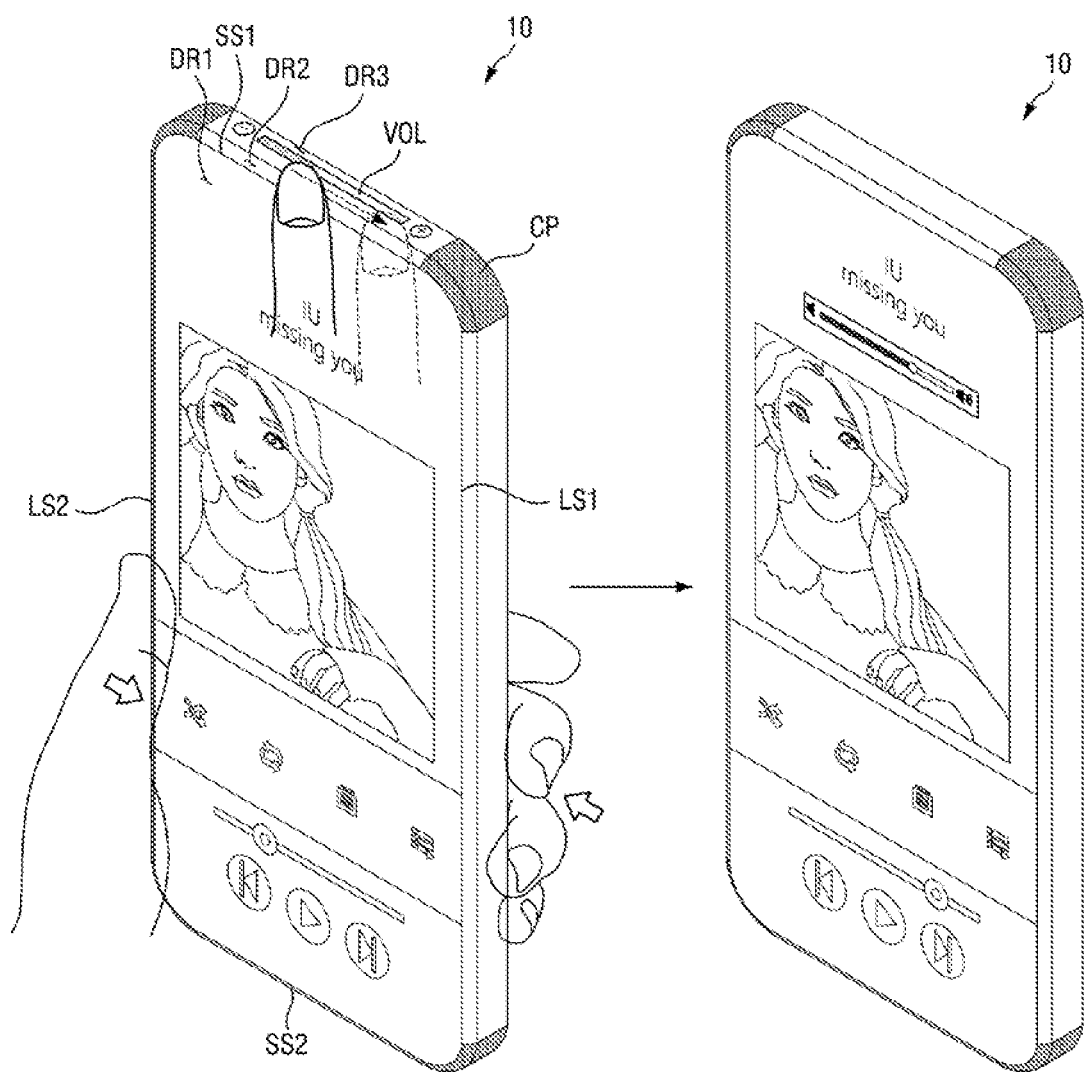
FIGS. 18 and 19 illustrate a music player execution screen according to another example of an exemplary embodiment.
Figure 19:
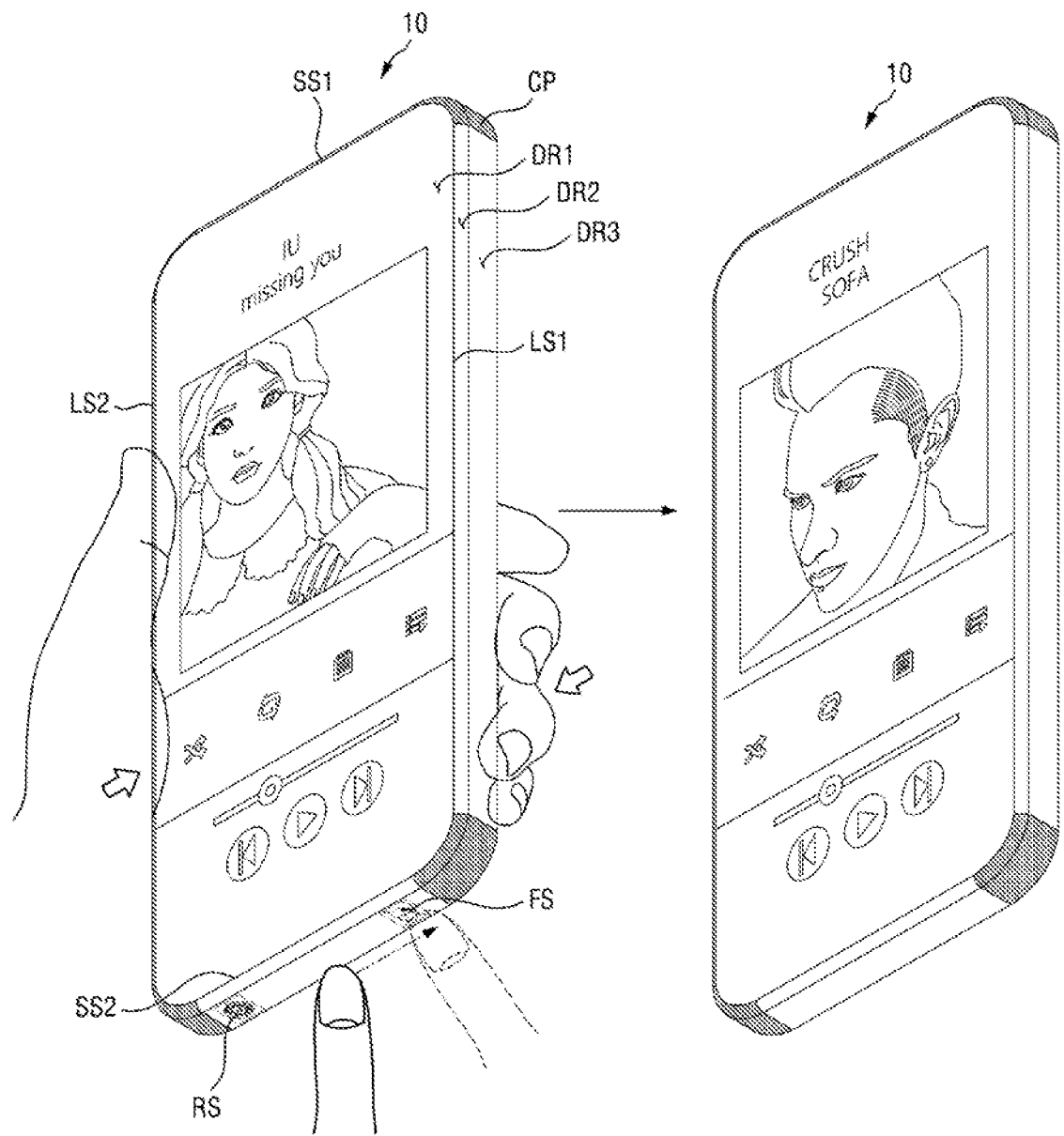

FIGS. 18 and 19 illustrate a music player execution screen according to another example of another exemplary embodiment.

Referring to FIGS. 18 and 19, a present exemplary embodiment differs from the exemplary embodiment of FIG. 17 in that the second side surface portion or the fourth side surface portion is swiped while the first side surface portion and the third side surface portion are squeezed.

Specifically, according to an embodiment, a user concurrently applies pressure to the second region DR2 or the third region DR3_LS1 and the second region DR2 or the third region DR3_LS2. That is, the user concurrently grips the second region DR2 or the third region DR3_LS1 and the second region DR2 or the third region DR3_LS2. The controller 710 senses a squeezing operation of the user by using the first force sensor 511 and the second force sensor 512.

According to an embodiment, the user touches the second region DR2 or the third region DR3_SS1, or the second region DR2 or the third region DR3_SS2 while maintaining a squeezing action with respect to the second region DR2 or the third region DR3_LS1 and the second region DR2 or the third region DR3_LS2. That is, the user swipe from a left edge region to a right edge region of the first short side SS1 with a finger or swipes from a left edge region to a right edge region of the second short side SS2. Here, the first short side SS1 and the second short side SS2 are disposed adjacent to and are connected to the first long side LS1. The first short side SS1 and the second short side SS2 are disposed adjacent and are connected to the second long side LS2. In a state in which a squeezing signal sensed in the second region DR2 or the third region DR3_LS1 and the second region DR2 or the third region DR3_LS2 is maintained, the controller 710 determines a signal as a swipe signal, where the signal is sensed by the touch sensing device 200 in the second region DR2 or the third region DR3_SS1 or the third force sensor 513. The same is true of the second short side SS2.

According to an embodiment, in a state in which a squeezing signal with respect to the first side surface portion, such as the second region DR2 or the third region DR3_LS1, and the third side surface portion, such as the second region DR2 or the third region DR3_LS2, is maintained, when a swipe signal is sensed with respect to the second side surface portion, such as the second region DR2 or the third region DR3_SS1, the controller 710 determines the two signals to be one signal. The controller 710 combines a state in which the user grips the first side surface portion and the third side surface portion and a state in which the user swipes the second side surface portion and recognizes the combined operations as a state of sequentially pushing virtual buttons.

As shown in FIG. 18, according to an embodiment, when a user swipes from a left edge region to a right edge region of the second region DR2 or the third region DR3_SS1 and the above-described condition is satisfied, the controller 710 increases a volume of music being played in proportion to a length of a swipe sensed through the touch sensing device 200 or the third force sensor 513. According to an exemplary embodiment, the third force sensor 513 includes first to sixth pressure sensing cells CE1 to CE6. Accordingly, the controller 710 adjusts the volume by up to six total stages in response to a swipe input of the user. However, the number of the pressure sensing cells is not limited thereto, and can vary according to a size of the display panel 300. An object VOL that visually represents volume can be displayed in the second area DR2 or the third area DR3_SS1.

As shown in FIG. 19, according to an embodiment, when a user swipes from one direction to the other direction in the second region DR2 or the third region DR3_SS2 and the above-described condition is satisfied, the controller 710 plays a previous or a next piece of music being executed based on a direction of the swipe sensed through the touch sensing device 200 or the fourth force sensor 514. According to an exemplary embodiment, the fourth force sensor 514 includes first to sixth pressure sensing cells CE1 to CE6. Thus, three pressure sensing cells can be allocated for each of a virtual button for reproducing a previous piece of music and a virtual button for reproducing a next piece of music. An object RS representing an album cover of the previous piece of music and an object FS representing an album cover of the next piece of music can be displayed in the second area DR2 or the third area DR3_SS2.

Figure 20:
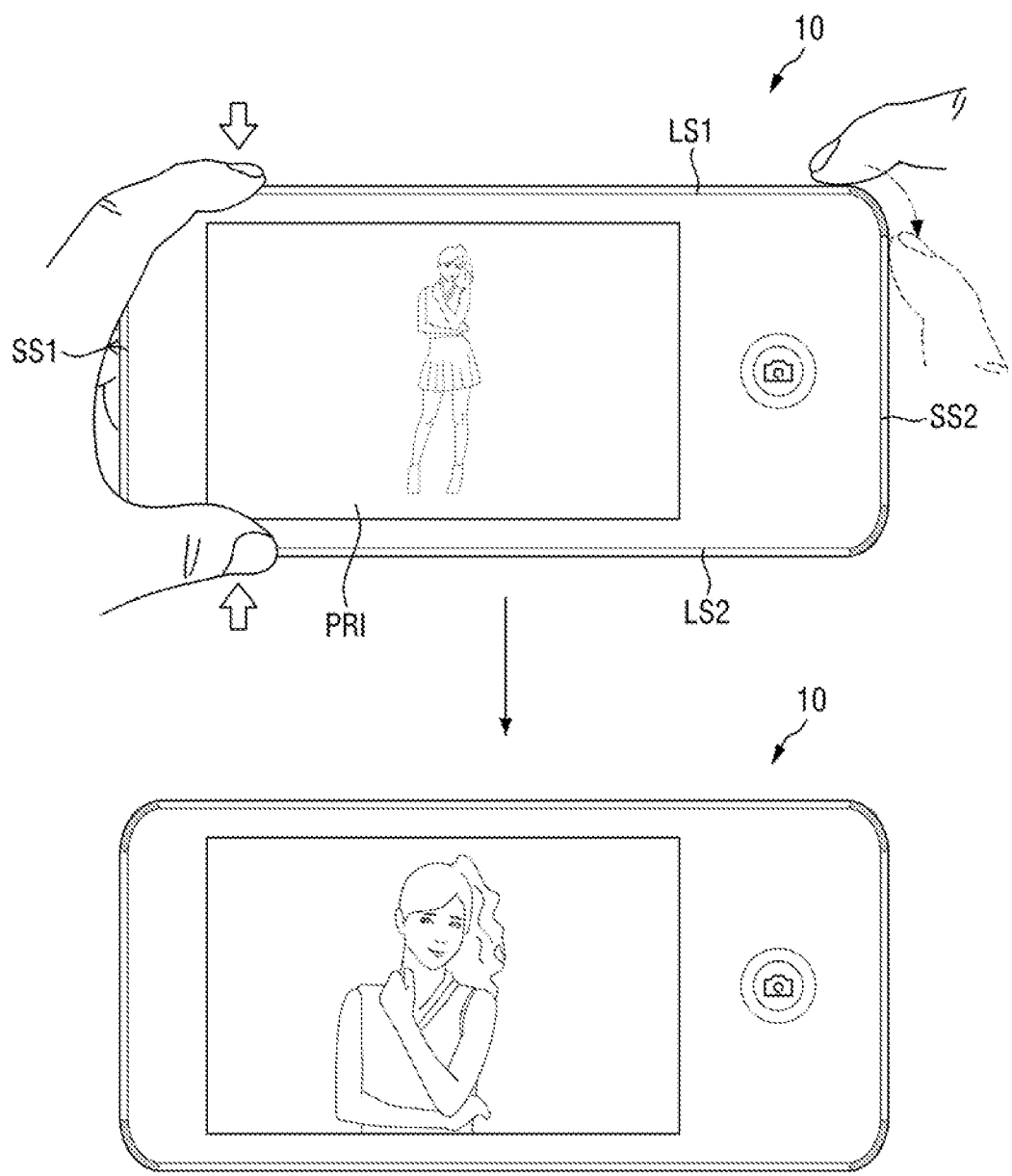
FIG. 20 illustrates a camera screen according to another example of an exemplary embodiment.

FIG. 20 illustrates a camera screen according to another example of another exemplary embodiment.

Referring to FIG. 20, a present exemplary embodiment differs from an exemplary embodiment of FIG. 17 in that the display device 10 is used in landscape mode rather than portrait mode and a second signal is a signal in which the first side surface portion and the fourth side surface portion, such as the second short side SS2, are consecutively swiped.

As shown in FIG. 20, according to an embodiment, a state in which a user swipes from a region of the first long side LS1 to a right edge region with a finger and a state in which the user swipes from an upper edge region of the second short side SS2 to another region are combined and recognized as a state of rotating a virtual wheel clockwise. Therefore, the controller 710 zooms in on a preview screen PRI of a camera application being executed.

However, according to an embodiment, when an input signal with respect to the second region DR2 or the third region DR3_SS2 is not sensed within a preset time from an interruption of a signal input in the second region DR2 or the third region DR3_LS1 the controller 710 determines the signal input received in the second region DR2 or the third region DR3_LS1 as one signal. For example, when a user does not touch the second short side SS2 within the preset time with a finger after swiping from a region of the first long side LS1 to a right edge region, the controller 710 adjusts the brightness of a screen.

According to an embodiment, a state in which a user swipes from a region of the second short side SS2 to an upper edge region with the finger and a state in which the user swipes from the right edge region of the first long side LS1 to another region are combined and recognized as a state of rotating a virtual wheel counterclockwise. Therefore, the controller 710 zooms out on the preview screen PRI of the camera application being executed.

A display device according to an exemplary embodiment can be intuitively operated by using force sensors mounted in edge regions of four sides of a touch panel and a display unit, thereby improving user convenience and satisfaction.

Effects of embodiments of the present disclosure are not restricted to the exemplary embodiments set forth herein and more diverse effects are included in this specification.

What is claimed is:
1. A display device, comprising:
a display panel that includes an upper surface, a first side surface portion that extends from a first side of the upper surface, and a second side surface portion that extends from a second side connected to the first side;
a first force sensor disposed in the first side surface portion and a second force sensor disposed in the second side surface portion; and
a controller that
determines a type and a state of an application being executed when a first input signal is sensed through the first force sensor and
executes an operation that corresponds to the type and the state of the application being executed when a second input signal is sensed through the second force sensor within a preset time from an interruption of the first input signal.
2. The display device of claim 1, further comprising a corner portion that is a non-display region formed between the first side surface portion and the second side surface portion.
3. The display device of claim 2, wherein the corner portion is curved in a plan view.

4. The display device of claim 2, wherein the preset time increases in proportion to a length of the corner portion.

5. The display device of claim 1, wherein,
when the type of the application corresponds to a photo album and the state of the application corresponds to a photo view mode,
the controller executes an operation of rotating an image displayed on the display, panel by 90° from a direction of the first side to a direction of the second side.

6. The display device of claim 1, wherein,
when the type of the application corresponds to a photo album and the state of the application corresponds to a thumbnail view mode,
the controller executes an operation of dragging an icon displayed at a position at which the first input signal is generated and dropping the icon at a position at which the second input signal is generated.

7. The display device of claim 1, wherein the display panel further comprises
a first upper curved surface portion formed between the upper surface and the first side surface portion, and
a second upper curved surface portion formed between the upper surface and the second side surface portion.

8. The display device of claim 7, wherein
the first force sensor is disposed in the first upper curved surface portion and the first side surface portion, and
the second force sensor is disposed in the second upper curved surface portion and the second side surface portion.

9. The display device of claim 8, wherein the first force sensor and the second force sensor each include a plurality of sensing cells.

10. The display device of claim 8, wherein the controller displays a guide mark on the first upper curved surface portion or the second upper curved surface portion according to the type and the state of the application.

11. A display device, comprising:
a display panel that includes an upper surface, a first side surface portion that extends from a first side of the upper surface, a second side surface portion that extends from a second side connected to the first side, a third side surface portion that extends from a third side opposite to the first side, and a fourth side surface portion that extends from a fourth side opposite to the second side;
a first force sensor disposed in the first side surface portion, a second force sensor disposed in the second side surface portion, a third force sensor disposed in the third side surface portion, and a fourth force sensor disposed in the fourth side surface portion; and
a controller that
determines a type and a state of an application being executed when a first input signal is sensed through the first force sensor and the third force sensor, and that
executes a function that corresponds to the type and the state of the application being executed when a second input signal is sensed through at least one of the first to fourth force sensors in a state in which the first input signal is maintained.

12. The display device of claim 11, wherein the second input signal is sensed through the second force sensor or the fourth force sensor.

13. The display device of claim 11, wherein the first force sensor, the second force sensor, the third force sensor, and the fourth force sensor each include a plurality of sensing cells.

14. The display device of claim 13, wherein the first input signal is a squeezing signal of concurrently pressing one or more sensing cells of the first force sensor and the third force sensor.

15. The display device of claim 13, wherein the second input signal corresponds to
a tap gesture of intermittently pressing some of the plurality of sensing cells of the second force sensor or the fourth force sensor, or
a swipe gesture of sequentially pressing the plurality of sensing cells of the second force sensor or the fourth force sensor.

16. The display device of claim 15, wherein,
when the type of the application corresponds to a music player and the second input signal corresponds to a tap gesture,
the controller plays or stops music.

17. The display device of claim 15, wherein,
when the type of the application corresponds to a music player and the second input signal corresponds to a swipe gesture sensed through the second force sensor,
the controller adjusts a volume according to a direction and a movement distance of the swipe gesture.

18. The display device of claim 15, wherein,
when the type of the application corresponds to a music player and the second input signal corresponds to a swipe gesture sensed through the fourth force sensor,
the controller plays a previous piece of music or a next piece of music according to a direction of the swipe gesture.

19. The display device of claim 11, wherein the second input signal is
sequentially sensed through the first force sensor and the fourth force sensor, or
sequentially sensed through the first force sensor and the second force sensor.

20. The display device of claim 19, wherein,
when the type of the application corresponds to a camera, the controller zooms in or zooms out on a subject, according to whether the second input signal is
sequentially sensed through the first force sensor and the fourth force sensor, or
sequentially sensed through the first force sensor and the second force sensor.

* * * * *